United States Patent [19]
Bush

[11] Patent Number: 5,708,427
[45] Date of Patent: Jan. 13, 1998

[54] VEHICLE IN-LANE POSITIONAL INDICATION/CONTROL BY PHASE DETECTION OF RF SIGNALS INDUCED IN COMPLETELY-PASSIVE RESONANT-LOOP CIRCUITS BURIED ALONG A ROAD LANE

[76] Inventor: E. William Bush, 6389 La Jolla Scenic Dr. South, La Jolla, Calif. 92037

[21] Appl. No.: 634,659

[22] Filed: Apr. 18, 1996

[51] Int. Cl.⁶ .................................................. G08G 1/01
[52] U.S. Cl. .......................... 340/941; 340/686; 340/933; 340/908; 180/168; 364/424.02
[58] Field of Search ................................. 340/941, 933, 340/938, 939, 988, 932.2, 686; 180/168; 324/655; 364/424.02

[56] References Cited

U.S. PATENT DOCUMENTS

| | | | |
|---|---|---|---|
| 3,873,964 | 3/1975 | Potter | 340/939 |
| 4,348,652 | 9/1982 | Barnes | 340/904 |
| 4,401,181 | 8/1983 | Schwarz | 180/168 |
| 4,800,978 | 1/1989 | Wasa et al. | 180/168 |
| 4,970,653 | 11/1990 | Kenue | 364/461 |
| 5,153,525 | 10/1992 | Hoekman et al. | 324/655 |
| 5,347,456 | 9/1994 | Zhang et al. | 364/424.02 |
| 5,357,432 | 10/1994 | Margolis et al. | 364/424.02 |

*Primary Examiner*—Jeffrey Hofsass
*Assistant Examiner*—Davetta Woods
*Attorney, Agent, or Firm*—Fuess & Davidenas

[57] ABSTRACT

A vehicle's position is determined, normally within ±0.37 inches, relative to an imaginary center line of a road lane along which are buried, normally about every 13 feet, completely passive resonant circuits, normally each a simple, inexpensive and durable 1-turn 11.5" diameter shallow loop of #12 copper wire in series with a proper capacitor, nominally 10 nanofarads, for resonance. In-lane positional determination is in and by a phase detection circuit, and process. A low-power r.f. electromagnetic field, normally 1.9432 MHz, is maintained in a (i) vertically- or (ii) horizontally-oriented first loop, normally a 6-turn 6-inch coil. Resonance is electromagnetically induced in nearby road coils; radiated fields are not involved. The induced r.f. field is itself then detected in a another, second, loop means within the vehicle. This second loop means may be a (i) horizontally-oriented 6-turn 6-inch coil, or, alternatively and for improved linearity of detection about lane center, (ii) two coils that are in the same plane, orthogonal relative to the first loop, and at any arbitrary angle (other than 90°) relative to the first loop. As the vehicle proceeds down the highway lane a position detector circuit provides an output error signal voltage—equivalent to the phase difference between the maintained and the detected electromagnetic fields—that is (nominally) positive if the vehicle is on the left side of the road loops, or negative if the vehicle is on the right side of the road loops. When the vehicle reaches the center of the lane then the positional error voltage (i.e., the phase difference) nulls out. This error voltage is used to provide the driver with a "steer left" or "steer right" indication, normally in and by a meter. In expansion of the system to fully-automated lane-holding control, the developed positional error voltage signal is used to control the steering of the vehicle.

26 Claims, 20 Drawing Sheets

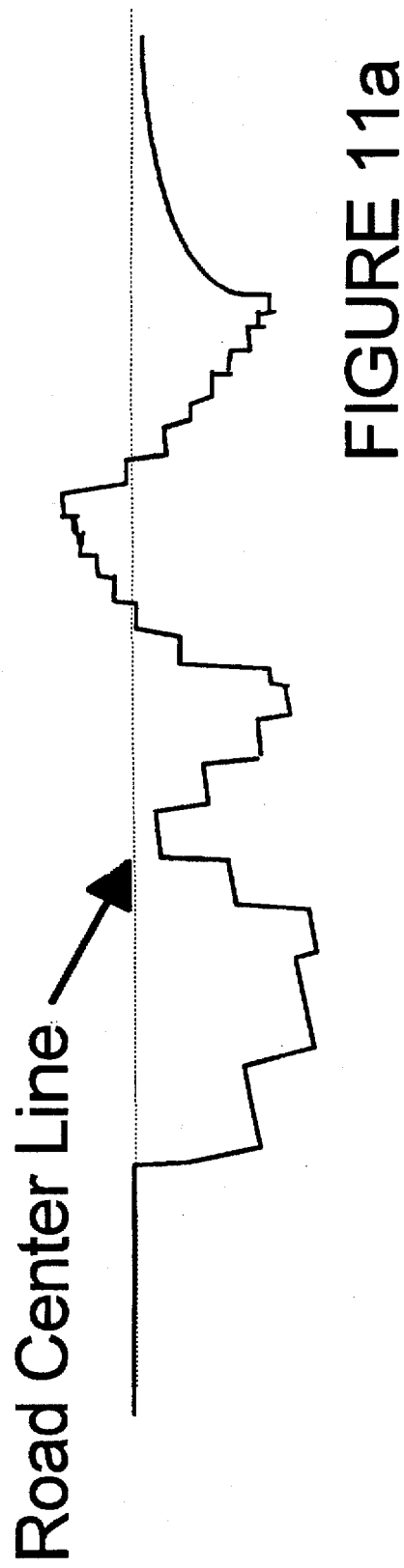
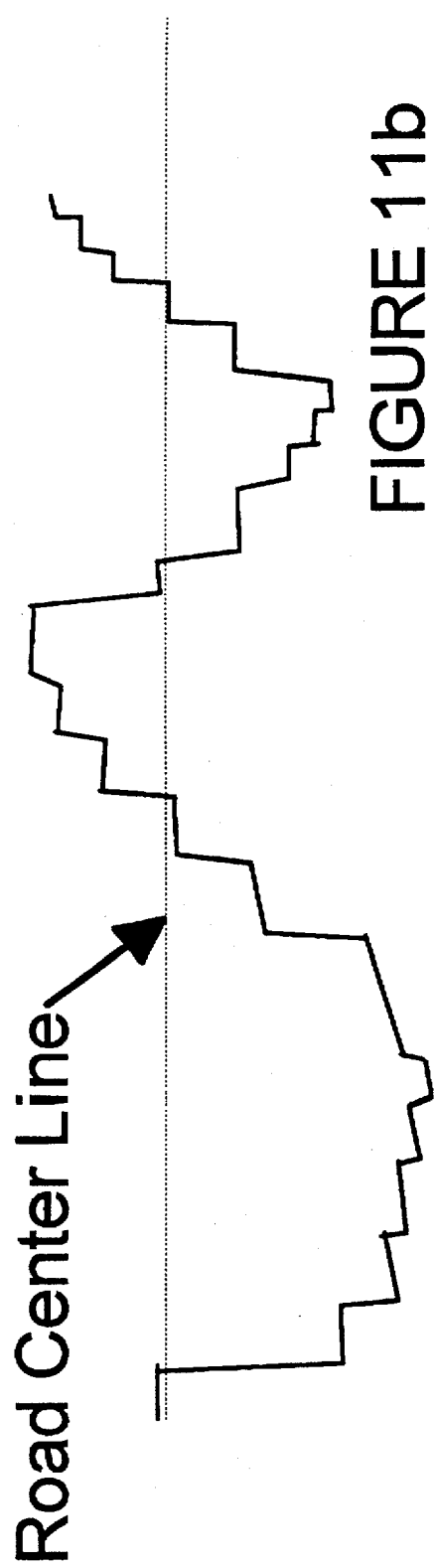
FIGURE 11a
FIGURE 11b $$\frac{d}{dt}\begin{bmatrix} y_r \\ \frac{d}{dt}y_r \\ \varepsilon - \varepsilon_d \\ \frac{d}{dt}(\varepsilon - \varepsilon_d) \end{bmatrix} = \begin{bmatrix} 0 & 1 & 0 & 0 \\ 0 & \frac{A_1}{V} & -A_1 & \frac{A_2}{V} \\ 0 & 0 & 0 & 1 \\ 0 & \frac{A_3}{V} & -A_3 & \frac{A_4}{V} \end{bmatrix} \begin{bmatrix} y_r \\ \frac{d}{dt}(y_r) \\ \varepsilon - \varepsilon_d \\ \frac{d}{dt}(\varepsilon - \varepsilon_d) \end{bmatrix} + \begin{bmatrix} 0 \\ B_1 \\ 0 \\ B_2 \end{bmatrix} \delta + \begin{bmatrix} 0 \\ d_1 \\ 0 \\ d_2 \end{bmatrix} = Ax + B\delta + d \quad (1)$$

FIGURE 17

$y_s = y_r + d_s(\varepsilon - \varepsilon_r)$   FIGURE 18

$d_1 = \frac{F_{wy}+F_{disturb}}{m} - \frac{V^2}{\rho} + \frac{A_2}{V}\frac{d}{dt}\varepsilon_d = d_1 - V\varepsilon_d + \frac{A_2}{V}\frac{d}{dt}\varepsilon_d$   FIGURE 29

$d_2 = \frac{T_{disturb}}{I_z} + \frac{A_4}{V}\frac{d}{dt}\varepsilon_d - \frac{d^2}{dt^2}\varepsilon_d = d_2 + \frac{A_4}{V}\frac{d}{dt}\varepsilon_d - \frac{d^2}{dt^2}\varepsilon_d$   FIGURE 30

VEHICLE IN-LANE POSITIONAL INDICATION/CONTROL BY PHASE DETECTION OF RF SIGNALS INDUCED IN COMPLETELY-PASSIVE RESONANT-LOOP CIRCUITS BURIED ALONG A ROAD LANE

BACKGROUND OF THE INVENTION

1. Field of the Invention

The present invention generally concerns detecting a vehicle's position relative to the center of a road lane.

The present invention particularly concerns an electronic phase detection process performed in the vehicle for determining the vehicle's position relative to successive ones of passive resonant circuits (loops) that are installed in series along a road lane.

2. Description of the Prior Art

2.1 General Utility of In-Lane Detection and/or Control

Automatic servo controlled steering serves to keep a vehicle exactly in the center of a road lane without driver assistance. Vehicles that automatically maintain an optimal, centered, in-lane position, and that reliably and properly maintain this in-lane position without the constant attention of the driver, are hypothesized to be less hazardous to occupants of the both the vehicle itself and of other vehicles. This is partially because a vehicle with automated lane holding will not inadvertently stray from its proper in lane position so far so as to hit something outside the lane. However, it is also because any such movements of the vehicle from the "straight and narrow"—whether prolonged and meandering or sudden and abrupt—as have typically proved disconcerting and stress-inducing to other drivers, and such as may induce accidents, are minimized.

In addition, automatic in-lane steering guidance and control alleviates the pressure, and the tedium, of the steering task on the vehicle's driver. Automated support for routine steering tasks is hypothesized to give the driver more time to prepare for, and react to, unexpected or unanticipated events that may occur.

Finally, automated in-lane steering control is part of the automated highway of the future. The automated highway will, with an addition of automated vehicle separation to automated vehicle steering, prospectively permit the packing of more vehicles moving more safely at higher effective speeds onto existing roads, especially in urban areas.

2.2 Specific Requirements for In-Lane Detection

Any system for the detection of vehicle in-lane position that has any component(s) placed out of doors and in the environment of the road would desirably ensure that this (these) component(s) is (are) rugged and durable. Out-of-doors components in accordance with the present invention will be seen to operate satisfactorily under several inches of asphalt, concrete and salt water, and to enjoy a rugged simplicity.

Any positional sensor would desirably be unaffected by the earth's magnetic field. Resonant loop sensors in accordance with the present invention will be found not to require such an interpolation correction, as is commonly done by a look up table, for the earth's magnetic field as is required for existing permanent magnet sensor systems. Reference Thomas Hessburg, Huie Peng, Masayoshi Tomizuke, Wie-Bin Zhang, "An Experimental Study on Lateral Control of A Vehicle", PATH Report UCB-ITS-PRR-91-17, pp. 3–4. "PATH" stands for "Program on Advanced Technology for the Highway", and is a Program of the University of California at Berkeley. "UCB" stands for the "University of California at Berkeley". "ITS" stands for "Intelligent Transportation Society", a program of the United States Department of Transportation (DOT). These acronyms will re-appear often in this disclosure.

Any positional sensor would desirably be economical. Positional sensors in accordance with the present invention will be seen to be completely passive resonating road coils (that return a signal to the vehicle where a phase comparison is accomplished to determine vehicle position). These coils will be seen to physically consist of a single capacitor and a length of #12 wire, and to be (i) economical of fabrication, (ii) economical of installation, and (iii) functionally insensitive to variations in fabrication and/or installation.

If radio frequency electromagnetic fields—with the potential for radiative emissions—are involved—as will be found to be the case with the system of the present invention—then any such emissions would desirably (i) minimal, or at least (ii) non-interfering with existing use(s) of the electromagnetic spectrum. It will be found signaling in the system of the present invention (preferably) uses a very localized static/inductive field in the HF (high frequency) range. Since the field strength power drops off as the sixth power of range, the possibility of electromagnetic interference by the system of the present invention is essentially eliminated. The electronic components used will also be seen to be of relatively low cost because the preferred operational frequency is in the HF range. This also makes the design of the system amenable to LSI (large scale integration) and insures an economical module for incorporation in the vehicle.

2.3 Existing Vehicle Guidance Systems

ITS has a stated need for a vehicle guidance system. See U.S. Department of Transportation, "IVHS Strategic Plan Report to Congress", Dec. 18, 1992, pp. 61–62. Many candidate systems have been or are currently being proposed, built and evaluated to satisfy this ITS requirement. See Robert E. Parsons and Wei-Bin Zhang in "Lateral Guidance Systems Requirements Definition", PATH Report UCB-ITS-RP, R-88-1, 1988, pp. 3–4.

Systems that have been considered candidates for this application and how they comply to the PATH acceptance criteria are as follows.

Wire sensing systems are the subjects of several reports in the late 1970s. Major drawbacks of these systems are 1) the road power required, 2) difficulty in accommodating land change, and 3) and entire route can be affected by one fault.

Video line following was reported by the Australia Road Research Board in 1982. A side-mounted video camera was utilized. Accuracy was affected by vehicle roll on curves. Operation was also limited by weather.

Discrete optical sensing was evaluated by PL in 1970s using lane-center retro-reflective buttons. System operation was limited by weather.

Video steering is a major effort current underway at the University of Munich. Stereo video images are formed and used. System operation and accuracy is affected by weather. System cost is high due to dual video cameras and large computer processing requirements.

Side-looking radar was the subject of an Ohio State evaluation reported in 1980. The need for a radar-reflecting metallic wall essentially eliminates use of this system in turns and intersections.

Applications of a side-looking acoustic system were reported by M.I.T. and by Ohio State University in 1983. An acoustic system requires extensive reference targets on both sides of the vehicle. Operation is impacted by ambient noise.

Discrete magnet sensing by use of strong magnets has been evaluated by the PATH program at University of California. Accuracy of magnet sensing is affected by earth's magnetic field. System cost is relatively high because of cost of individual magnets and the installation cost of the magnets. (The system of the present invention will also be seen to incur an installation cost. However, sensor devices of the present invention will be seen to be generally much smaller and with a shallow profile, emplaced at much shallower depths, and—by properties of corrosion resistance and compatible coefficient of expansion—to be generally much more compatible with, and more easily and cheaply emplaced in, common concrete and asphalt road surfaces than are large permanent magnets.)

Such issued patents as exist regarding lane detection and vehicle lane-control sytems primarily deal with optical technologies.

U.S. Pat. No. 5,351,044 to Matbur, et. al. for a VEHICLE LANE POSITION DETECTION SYSTEM concerns a low cost, real time vehicle lane position detection system for determining and maintaining the position of the vehicle on a highway. The system comprises an image sensor mounted on the front of an automotive vehicle and an integrateed processor for performing real-time lane mark detection. The sensor/processor system identifies highway lane marks on the detector image plane by using a nonlinear resistive network for detecting outliers. A line detection algorithm, such as the Hough transform, is used to determine the lane marks from the outliers on the image plane. Because the expected lane position can be determined in advance, an added degree of signal-to-noise discrimination is achieved by providing feedback to the processor for outlier detection. The position of the vehicle in the lane is determined and tracked from the position of the detected lane marks on the image plane given the sensor position and optical geometry.

U.S. Pat. No. 5,318,143 to Parker, et. al. for a METHOD AND APPARATUS FOR LANE SENSING FOR AUTOMATIC VEHICLE STEERING concerns a lane sensing system including a processor operable to drive an infrared optical transmitter. Light is reflected by a center stripe placed in the center of a highway lane. Reflected light is received in right and left receivers. The processor uses the information to control a power steering control system and a speed control system. Information may be encrypted into the center stripe and used by processor to control the speed of the vehicle or to display information to an operator of the vehicle through a display system.

U.S. Pat. No. 5,245,422 to Borcherts, et. al. for a SYSTEM AND METHOD FOR AUTOMATICALLY STEERING A VEHICLE WITHIN A LANE concerns an automatic vehicle steering system for automatically steering a vehicle along a lane in a road. A video sensor is included for generating a plurality of frames of video images of the road. A computer processor analyzes the frames to determine the lane boundaries of the road and the position of the vehicle. The system uses the engagement of a cruise control switch and a steering control switch to initiate processing of the image data and automatic steering of the vehicle.

2.3 Conformance to PATH Requirements

Harmonization of in-vehicle control systems and U.S. national highways is mandatory, The vehicle lateral control system that is ultimately selected and adopted ultimately as the U.S. national standard must provide a specified performance at the lowest competitive cost. The performance criteria of a candidate lateral control system was defined by Robert E. Parsons and Wei-Bin Zhang in "Lateral Guidance Systems Requirements Definition", PATH Report UCB-ITS-RRR-88-1, 1988, pp. 3–4, op cit. These requirements are paraphrased as follows:

An in-vehicle control system must be accurate and safe. The highway reference must always be present and unaffected by road construction, maintenance or externalities, i.e. weather.

An in-vehicle control system should be not be influenced by local faults. The highway reference should not be subject to total loss of use if an isolated fault occurs.

An in-vehicle control system should be easy to repair, or restore to operability. Because of detour inevitability the highway reference should be easy to relocate.

An in-vehicle control system should have all weather capability: The need for lateral control is accentuated by snow and bad weather. A candidate system must provide operation under all weather conditions. Indeed, a prototype in-lane control system might typically be first installed in the operational environment of a commercially important Northern access road where snowplows were used repeatedly in winter to clear snow and ice. Typically the boundaries of such a road are difficult to identify during a snow storm, and clearing of the road is often delayed until the road boundary is visible. Often long poles with reflectors are positioned along side the road at considerable expense for this purpose. It will be seen that installing a resonant loop sensor system in accordance with the present invention in both snowplows and in the road could be accomplished at a defined and limited expense. A need would be satisfied while such an installation could provide an invaluable "beta test site" for system validation.

An in-vehicle control system should have reasonable costs. Both initial procurement and life maintenance costs should be attractive.

An in-vehicle control system must exhibit ruggedness and long life.

An in-vehicle control system would desirably exhibit flexibility. Vehicle to road sensing variations should be accommodated for vehicle and for roads of different types, speeds, purposes, etc. If transmission and reception are involved, then adjustments to transmitting power and/or receiver sensitivity should be possible, and even convenient. The size and shape of any in-road sensor(s) should be modifiable as required and desired to minimize costs and/or railer the sensor(s) to the local environment of use. Sensors in accordance with the present invention will be seen to meet these criteria. However, a linear sensor output with lateral deviation, and/or highly accurate distance sensing, might also be nice. Sensors and sensor systems in accordance with the present invention will soon be seen to be susceptible of being corrected and optimized to linear performance and high accuracy, but are inherently neither (i) linear nor (ii) highly accurate in assessing the magnitude—as opposed to the direction and the existence—of any divergence in a vehicle's actual (in-lane) position from the vehicle's desired position.

It will next be seen that the resonant loop sensor system in accordance with the present invention broadly and substantially complies with the above requirements, while meeting these criteria at a very low, and highly competitive, cost.

SUMMARY OF THE INVENTION

The present invention contemplates a phase detection system and method for determining a vehicle's position relative to resonant circuits (loops) that are installed at typically periodic locations along a road lane. The resonant circuits are completely passive, typically consisting of a buried 11/5 inch loop of #12 copper wire plus a capacitor. As a vehicle proceeds down a road lane it maintains a radio frequency (r.f.) electromagnetic field that causes One or more then-proximately located resonant circuits to resonate, re-generating the r.f. electromagnetic field. A position phase detector circuit in the vehicle detects this induced r.f. electromagnetic field, providing an output signal voltage which is positive if the vehicle is on the left side of the loops or negative if the vehicle is on the right side of the loops. When the vehicle reaches the center of the road lane then the voltage nulls out. The magnitude of the positional error voltage varies (but not linearly) with the degree of separation from the resonant loops, and, when the resonant loops are buried down the center of the lane, the lane center.

The positional error voltage may used to provide the vehicle's driver with a "steer left" or "steer right" directional indication, and also with the magnitude of the required correction. One means of indicating both (i) direction and (ii) magnitude is a simple bi-directional D'Arsonval meter.

Alternatively, or additionally, the positional error voltage may be used as a feedback signal in a servo control mechanism that actually serves to steer the vehicle. This automated directional steering function is conceptually similar to the automated speed control implementation already common in luxury vehicles, and includes manual override provisions. Automatic servo-controlled steering serve to keep the vehicle exactly in the center of the road without driver assistance.

Placement of the resonant circuits, or loops, in the road is similar to the previous magnet sensing approach. However, because the resonant loops essentially consist of only copper wire and a capacitor, initial procurement cost is low and the road installation is also low because of the resonant loops' shallow profiles. Finally, life cycle cost is low because the resonant loops are completely passive, and highly durable even in the out-of-doors environment embedded in a road.

1. Coupling is Inductive

The coupling of energy between "transmitter" circuits in the vehicle, to the resonant loop sensors along the road lane, and, in reverse, from the resonant loop sensors back to further "receiver" circuits in the vehicle, is entirely inductive, and is not radiative. Consider the basic electromagnetic field equation $$E_\theta = \frac{1}{4\pi\epsilon} [(1/r^3) + (jk/r^2) + (k^2/r)\sin\theta p_o e^{j(\omega t - kr)}]$$

where $E_\theta$ is the electric field potential, r is the range, $\theta$ is the vector angle, $\pi$ and $\epsilon$ are constants, $\omega$ is $2\pi$ times the frequency, and k is $2\pi$ times the wave length. See Samuel Silver, *Microwave Antenna Theory and Design*, p.93, Boston Technical Lithographers, Inc., 1963.

The three terms in the three parenthesis of the equation represent the three partial fields: (1) the "static field" varying inversely with $r^3$; (2) the "induction field" varying inversely with $r^2$; and (3) the "radiation field" varying inversely with r. In accordance with the present invention, it is the "static field" and the "induction field" that are of interest. Electromagnetic energy in this regime is often called the "near field". These "near fields" fall off so rapidly with distance that they are typically completely neglected in the analysis of radiation fields, such as, inter alia, radio radiation fields.

The near-field, inductive, coupling of the present invention offers several advantages.

First, the loop elements of the present invention from which and to which electromagnetic radiation is inductively coupled are very small relative to any antennas from which electromagnetic radiation might be emitted or received. The inductively coupled loops in the vehicle, and buried in the road lane, are thus compact and easy to install.

Second, it is desirable that the electromagnetic field should not be radiated, and that the static fields and the induction fields should respectively fall off as $r^3$ and $r^2$. The rapid fall-off permits that the induction coils within a vehicle should inductively induce an appreciable electromagnetic field within, and should subsequently sense the electromagnetic field so induced, within only the very closest inductive loops within the road lane, typically exciting and sensing only one such inductive loop at any one time. The inductive coupling, and sensing, at any one vehicle does not affect these same activities at any other vehicle.

Third, the inductive coupling is immune to the earth's electromagnetic field—as negatively affects the sensing of buried magnets—and is substantially immune to electromagnetic interference, radio frequency or otherwise. The noise figure of the bi-directional inductive coupling is excellent under all conditions of weather, electromagnetic interference, component variation, frequency drift, etc.

Fourth and finally, it should be understood why, if the preferred electromagnetic field of the present invention is not being radiated, the field is still maintained at a radio frequency, preferably about 1.5 MHz. The reason, as further explained hereinafter, is that the resonant circuits (in the form of loops, or coils, with a series capacitor) that are buried in the road lane may be "tuned" so as to be highly resonant at this frequency. The "tuned" resonant circuits will resonate very strongly, and, in accordance with the present invention, very detectably, when, in accordance with the present invention, they are inductively coupled to an electromagnetic field of the appropriate frequency.

The construction and the tuning of the resonant circuits need not be overly meticulous, nor precise. Indeed, in one advanced embodiment of the present invention a single receiver loop is replaced with two receiver coils. The two receiver coils are tuned to two different resonant frequencies; one below a base operational (resonant) frequency and the second above the operational frequency. This embodiment converts the combined received amplitude of the two coils into a constant amplitude signal with a linearly changing output phase with respect to the road coil lateral position. By selecting the resonant frequency of the first receive coil at one half the half power bandwidth below operating frequency, the first coil output phase is shifted −45°. Concurrently selecting the resonant frequency of the second receive coil at the half power bandwidth above the operating frequency shifts the second coil output phase +45°. When the output of the first coil is added to the output of the second coil then the combined output signal has a nearly constant amplitude and a linear output phase with respect to the lateral position of the road coil. The phase changes results from the relative receive amplitude of the two individual receiver coils as the distance to the road coil changes laterally.

The receiver is a combination of a amplifier and a phase detector. Signals from the two coils are received at the amplifier as a vector sum. The vector sum of the coil signals is amplified, and the receiver automatic gain control maintains a constant amplitude signal output from the amplifier. The phase of this amplifier output signal changes in accordance with the position of the road coil relative to each, and to both, of the receive coils.

The amplified vector-sum signal is received at the phase detector, and used to produce a positional error output signal—really the phase difference between the transmitted r.f. electromagnetic field and the vector combined received electromagnetic field—that is linear in the cross-over region, and that goes from a positive to a negative voltage (or vice versa, depending upon direction of the cross-over) as the vehicle receive coils cross over the road coil.

This linear detected phase angle about the centerline of the buried resonant circuit (the road coil) permits accurate determination of the offset of the vehicle relative to lane center to a matter of a fraction of an inch.

2. Preferred Method and System for Determining a Vehicle's Position on Road Lane In a preferred method of the present invention for determining a vehicle's position on a road lane a large number of passive resonant circuits—normally a simple single 11.5 inch diameter loop made from thirty inches of #12 copper wire in electrical series with a capacitor of nominal value 10 nanofarads—are positioned—normally as buried in the pavement—along the road lane, typically down an imaginary center line at even periodic intervals of approximately 13 feet separation one resonant circuit to the next. A electromagnetic field—preferably a radio frequency electromagnetic field, more preferably an r.f. field between 500 kHz and 5 MHz, and still more preferably a filed of about 1.5 MHz frequency—is inductively coupled from a first loop in the vehicle as the vehicle proceeds along the road lane. The word "loop" will be understood to have its topological meaning as a closed surface, whether circular in cross section or not. The preferred first "loop" is a six-turn coil of six inches diameter. In one, first, embodiment the first "loop" is located in a substantially vertical plane. In another, advanced second, embodiment the first "loop" is located in a substantially horizontal plane.

The energy of the electromagnetic field is strongly inductively coupled in the near field into one or more of the resonant circuits as are then proximate to the vehicle. The words "inductively coupled" will be understood to mean that the static and, to greater effect, the inductive components of the electromagnetic field—which components as respectively fall off as $r^3$ and $r^2$ at distance r from the first loop—are the most important cause of effects at the coupled resonant circuits, and that radiative transmission and reception—such as falls off with r—is not appreciably involved. The resonant circuits into which electromagnetic energy is inductively coupled inherently use this coupled energy to create their own r.f. electromagnetic field.

This secondary, induced, electromagnetic field is then detected in yet another, second, loop in the vehicle as the vehicle proceeds along the road lane. In the first embodiment the detection "loop" is preferably yet another coil of six turns of six inches diameter. In this embodiment the second loop is preferably located orthogonally to the horizontal resonant circuit loops in the road, and in a substantially vertical plane. This orientation between the first and the second loops helps preclude that excessive electromagnetic field energy from the first loop of the vehicle should be coupled into the receiving second loop.

In the second embodiment the detection "loop" consists of two receive coils. Both receive coils are oriented orthogonally relative to the transmit coil. Each is at any arbitrary angle (other than 90°, or perpendicular) relative to the horizontal loops of the resonant circuits within the road, typically 0° (parallel, and horizontal), or else 45°. Finally, both receive coils are in the same plane. Substantial isolation from the electromagnetic field of the first loop is maintained because the two receive coils are each perpendicular to the first, transmit, loop. The two coils produce a quadrature parallel output into the receiver. The amplitude of the receiver output remains roughly constant (due to AGC) meanwhile that the detected phase angle is roughly linear about the centerline of the buried resonant circuit.

The phase of the (r.f.) electromagnetic field maintained in the first loop is compared to the phase of the detected (r.f) electromagnetic field to determine, based on observed phase, whether the detector means in the vehicle is to the left or to the right of a then-proximate resonant circuit. If the vehicle has its receiving loop centered over a resonant coil then it is (normally) centered in the lane. The magnitude of any detected phase difference is indicative of the amount of deviation from center, although not linearly.

These and other aspects and attributes of the present invention will become increasingly clear upon reference to the following drawings and accompanying specification.

BRIEF DESCRIPTION OF THE DRAWINGS

FIG. 11, consisting of FIG. 11a and FIG. 11b, are two graphs of exemplary actual road test data for two vehicle runs using the vehicle in-lane detection and/or control system in accordance with the present invention.

FIGS. 17–30 respectively show equations (1) through (14) as concern the dynamical modeling of the vehicle in-lane control system in accordance with the present invention as shown in schematic diagram in FIGS. 14 and 15.

DESCRIPTION OF THE PREFERRED EMBODIMENT

1. Function of the System and Method of the Invention

Figure 1:
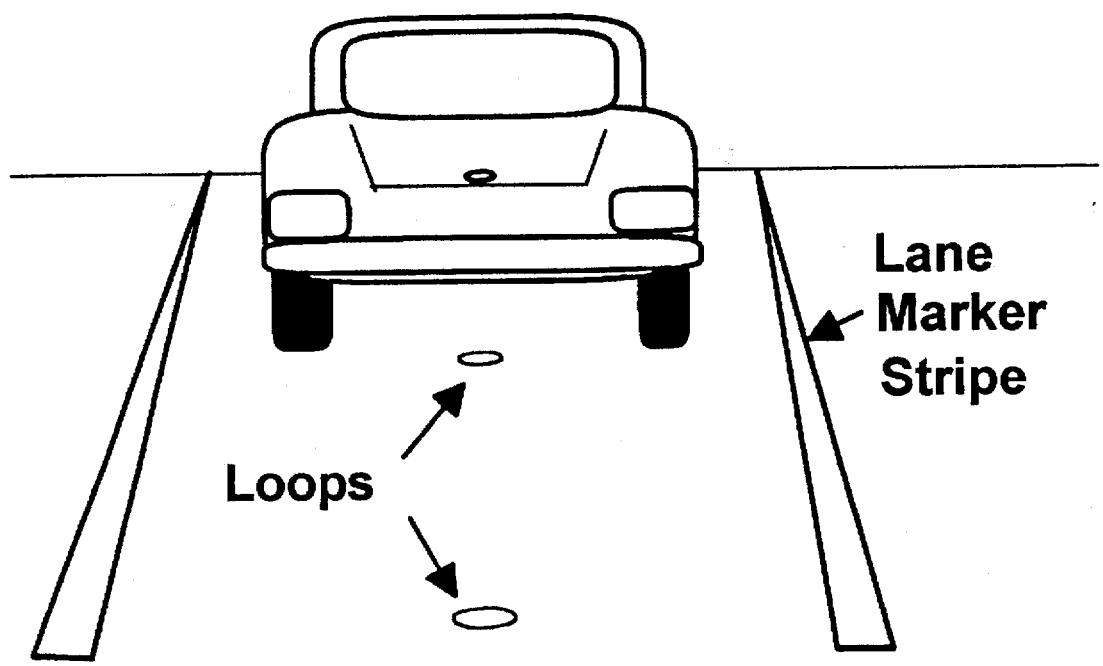
FIG. 1 is a diagrammatic representation of the vehicle in-lane detection and/or control system of the present invention where a phase detection circuit, and process, in the vehicle is used to determine the vehicle's position relative to a resonant circuit (loop) installed in the center of the lane.

The present invention concerns a new system, and method, for detecting a vehicle's position relative to the center, or center line, or mid-line, of a road lane. The system uses a phase detection circuit, and process, in the vehicle to determine the vehicle's position relative to each of a succussion of resonant circuits (loops) that are installed, normally by burying, along an imaginary center line of the lane. This is diagrammatically illustrated in FIG. 1.

As the vehicle proceeds down the highway lane its position detector circuit provides an output signal voltage that is (nominally) positive if the vehicle is on the left side of the loops or negative if the vehicle is on the right side of the loops. When the vehicle reaches the center of the lane then the positional error voltage—which error voltages is actually the phase angle deviation of the maintained electromagnetic field versus the detected electromagnetic field—nulls out. This error voltage is used to provide the driver with a "steer left" or "steer right" indication, normally in and by a meter. In expansion of the system to fully automated lane-holding control, the error voltage is used to control the steering of the vehicle.

2. Genesis of the New Approach

The vehicle positioning system of the present invention evolved from observations of the signal return from a passive resonant circuit. When signal energy is inductively coupled into a resonant tank circuit then this tank circuit inherently uses this energy to produce and electromagnetic field. This energy interchange provides the basis for the vehicle positioning system of the present invention.

Figure 2:
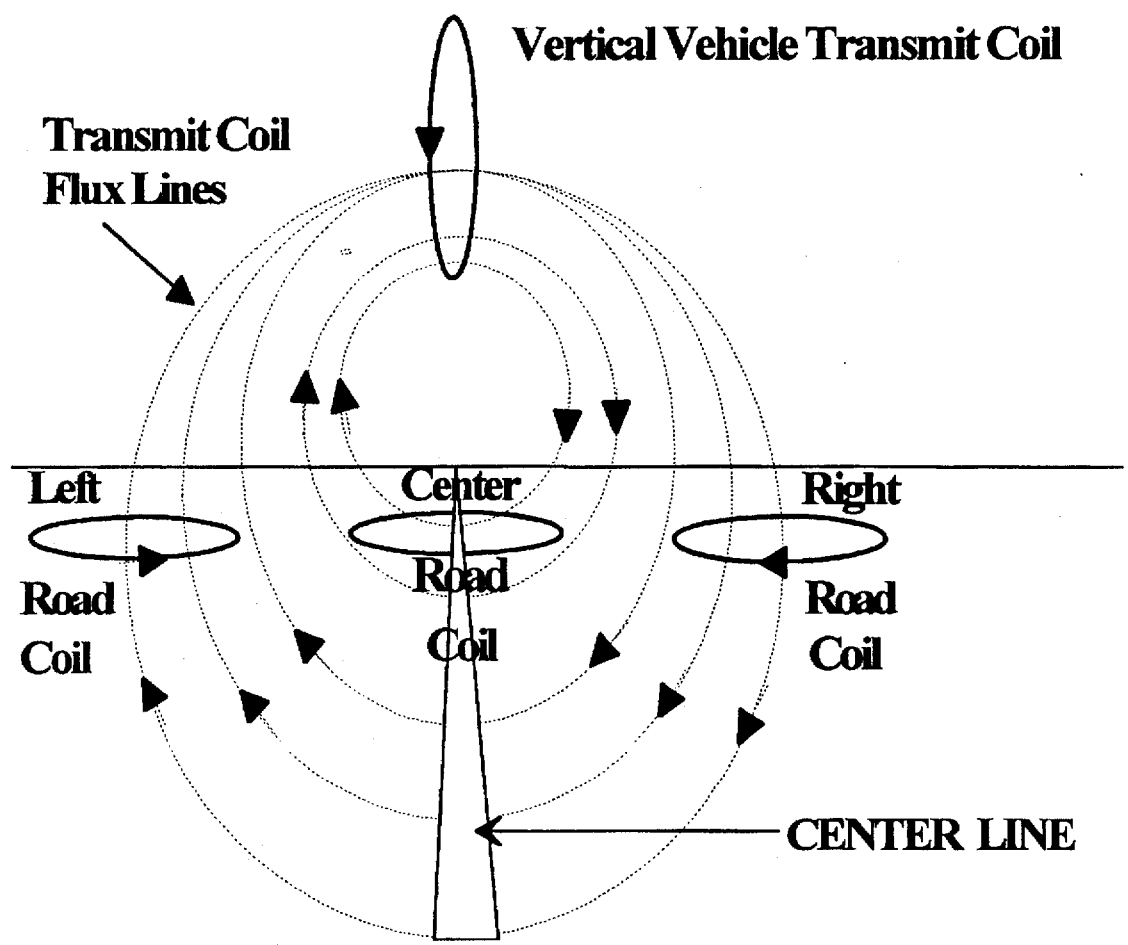
FIG. 2 is an illustration of the vehicle to road link, or how the phase and polarity of the inductively coupled signal from the vehicle's "transmit" loop, or coil, into the road's loop, or coil, depends on the position of the road loop (coil) relative to the vehicle's "transmit" loop (coil) in the preferred embodiment of a vehicle in-lane detection and/or control system in accordance with the present invention.

FIG. 2 illustrates that the phase and polarity of the inductively coupled signal from the vehicle "transmitter" coil into the road coil both depend on the position of the road coil relative to the "transmitting" coil. (It will be understood throughout the ensuing explanation of the present invention that "transmitter" and "transmitting", or "receiver" and "receiving", do not mean radiatively transmitting nor radiatively receiving. Transmitting and receiving are used in the general context of the electromagnetic induction of effects, or the induced response to such effects.) No signal is induced into the road coil if it is centered directly below the vehicle's transmitting coil. The current induced in the road coil circulates in a clockwise direction (as viewed from above) it is on the right side of the transmitting vehicle coil, and in a counterclockwise direction if it is on the left side of the transmitting vehicle coil.

Figure 3:
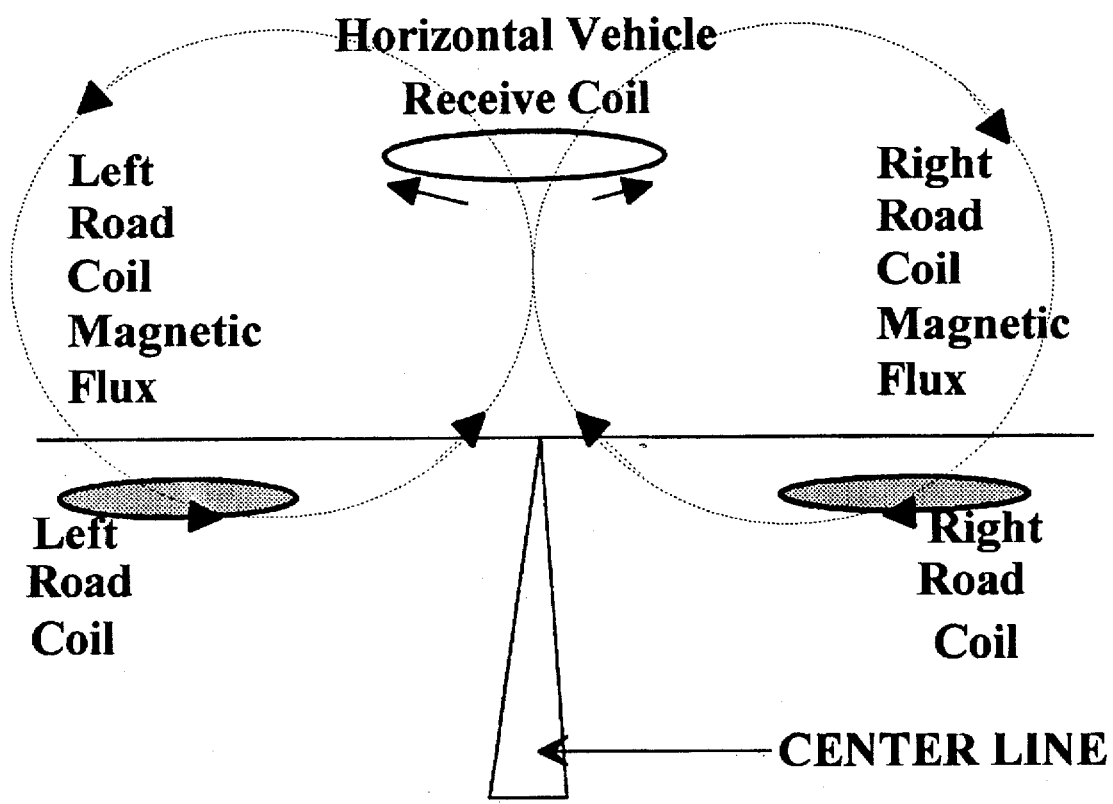
FIG. 3 is another illustration, similar to FIG. 2, of the road to vehicle link, particularly a secondary induction coupling from the road loop (coil) into the vehicle "receive" loop (coil), in the preferred embodiment of a vehicle in-lane detection and/or control system in accordance with the present invention.

The secondary induction coupling from the road coil back into the vehicle's receive coil is illustrated in FIG. 3. Note that the vehicle's receive coil is preferably mounted at right angles to the vehicle's transmit coil. The vehicle's receive coil is preferably mounted horizontally, and the vehicle's transmit coil vertically, as illustrated. This relative orientation prevents the vehicle's transmitting coil from coupling energy directly into the vehicle's receiving coil. These two coils, being cross polarized, are therefore completely orthogonal to each other. This permits the receive coil to receive the relatively weak signal return from the road coil without being saturated by the transmitter signal.

The induced current in the horizontal vehicle receive coil is shown to be clockwise if the road coil is on its left side and counterclockwise if the road coil is on its right side. This results in the receive coil voltage reversing polarity if and when the road coil changes sides. The vehicle receive coil voltage polarity provides the directional signal for vehicle steering. Sensing the polarity of the received signal is accomplished using the transmitter signal as a phase detection circuit reference in the receiver.

3. Evolution of the New Approach

The evolution of the system of the present invention underwent a rather substantial change during an initial phase of implementation. Rather than operating the system at the presently-preferred radio frequency between 1 and 2 MHz the receiver and transmitter were initially designed and build to operate at 11 MHz. The higher frequency was selected to reduce the size of the coils and to increase the operating range. When the receiver and transmitter were completed a successful hard wire range test was accomplished. Next a radiated test established that the loops were essentially non-functioning as antennas. Quarter wave stub antennas worked well but range measurements utilizing the loops as antennas were well below expectations. The problem was found to be associated with the antenna design. The road coil can be considered to be a r.f. loop antenna. The radiation resistance which couples the transmitter power to free space is expressed by the formula:

$$R_o = 320\pi^6[(r_o)/(\lambda)]^4$$

where $r_0$ is the loop radius and k is the wave length. See Richard C. Dorf, *Electrical Engineering Handbook*, p. 863, CRC PRESS, Boca Raton, Fla., 1993.

At 11 MHz the radiation resistance was low compared to the loss resistance of the copper in the transmitter coil and the radiation efficiency was prohibitive. Once this was established the receiver and transmitter were redesigned to operate at 60 MHz. The resulting radiation resistance was calculated to be:

$$Ro_o = 320\pi^6[(9 \times 16)/(12 \times 983.5)] = 1.348 \text{ ohms}.$$

Even though the radiation resistance was low even at 60 MHz, it was large compared to the copper loss and the antenna efficiency was satisfactory.

Unfortunately, operation at 60 MHz also proved to be unsatisfactory.

The 60 MHz vehicle equipment included orthogonally-arranged receiving and transmitting loop antennas that were integrally packaged. When the 60 MHz receiver and transmitter were connected to the double-loop orthogonally-arrayed antenna it appeared to be impossible to achieve satisfactory isolation between the transmitting and receiving antenna loops. It was eventually established that the road coil return signal was seriously masked by extraneous signals from surrounding objects.

Another system problem was also identified that established that a lower frequency would have to be used for the system to function. The wave length at an operational frequency of 60 MHz was roughly 16 feet, which causes that the signal returning from a road coil would reverse phase every 8 ft. Since the range utilizing the 60 MHz components could exceed 8 ft. an ambiguity would exist. This ambiguity would be avoided however, if the system operational range were designed to be less than one half the wave length.

At this point the system design was again reviewed with respect to optimizing the operational frequency taking into consideration the problem with the extraneous signals and the range ambiguity. A lower frequency would avoid the ambiguity problem—but would again introduce the problem of achieving a reasonable radiation resistance for the antenna which was the primary reason for going to the 60 MHz frequency from the original 11 MHz.

Another possible approach was to abandon operating with the radiation field and communicate with the road coil utilizing either the static field or the inductive field. Since these fields drop off much faster than the radiation field it meant reducing the range. It was then recognized and appreciated that an accelerated drop in signal level with respect to range offered an advantage. The resulting reduced range eliminated reflections from surrounding objects except in the immediate vicinity of the vehicle. This advantage justified the lower operating frequency providing the resulting receiver sensitivity and dynamic range were satisfactory.

Operating in the near field requires an understanding of the three components of the electromagnetic field. This is clarified by referring to the basic electromagnetic field equation:

$$E_\theta = \frac{1}{4\pi\epsilon}[(1/r^3) + (jk/r^2) + (k^2/r)\sin\theta p_o e^{j(\omega t - kr)}]$$

where $E_\theta$ is the electric field potential, r is the range, θ is the vector angle, π and ε are constants, ω is 2π times the frequency, and k is 2π times the wave length. See Samuel Silver, *Microwave Antenna Theory and Design*, p.93, Boston Technical Lithographers, Inc., 1963.

The three terms in the parenthesis represent the three partial fields (1) the "static field" varying inversely with $r^3$; (2) the "induction field" varying inversely with $r^2$; and (3) the "radiation field" varying inversely with r. Values for these terms were calculated and plotted in FIG. 4 using feet for range and 2πλ for k.

4. Preferred Embodiment of the Resonant Loop In-Lane Detection System

Figure 4:
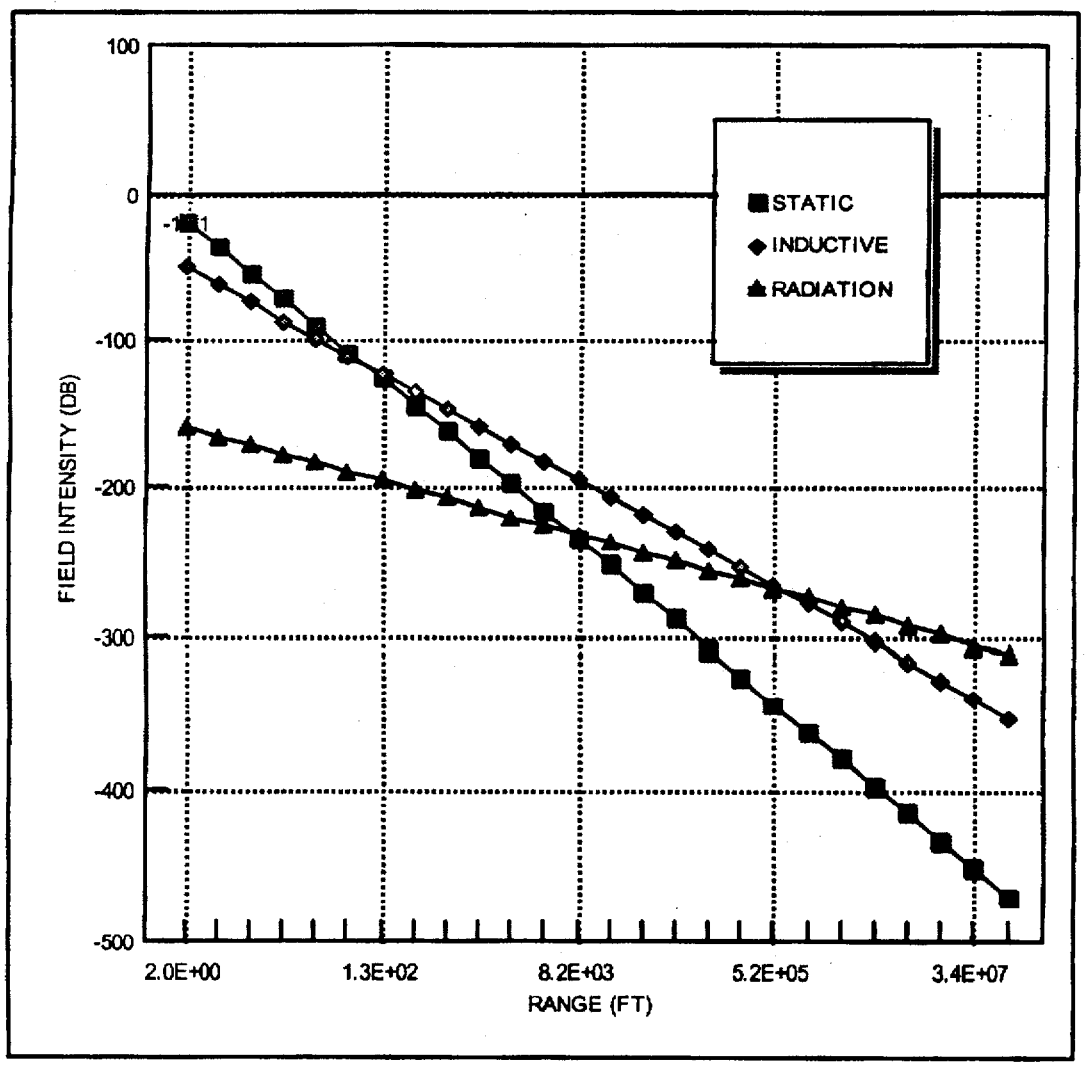
FIG. 4 is a graphical plot of relative field intensity, particularly the (1) the "static field" varying inversely with $r^3$; (2) the "induction field" varying inversely with $r^2$; and (3) the "radiation field" varying inversely with r (all as use feet for range and $2\pi\lambda$ for k) in the preferred embodiment of a vehicle in-lane detection and/or control system in accordance with the present invention.

The frequency selected for the resonant loop in-lane detection system was 1.8432 MHz, which equates to a wave length (X) of approximately 533.6 ft. Evaluation results show that the static field dominates out to about 64 feet where the induction field takes over and becomes dominate. Finally the radiation field takes over at $2^{18}$ feet (262,144 ft), which is nearly 500 wave lengths. The three field intensity vectors were added appropriately to show the combined field intensity. This resulting field intensity was found to follow or essentially equal the largest of the three field intensity vectors. FIG. 4 shows that if the system is operating at 1.8432 MHz and the range is anything less than 20 feet, then the field strength will follow the static field intensity and will vary inversely with $r^3$.

Both the receiver and the transmitter were subsequently changed to operate at 1.8432 MHz. In the course of changing the frequency a second modification was made to increase the receiver dynamic range. A additional stage of AGC control was incorporated into the receiver. This improved the receiver dynamic range by providing two cascode control stages of AGC, each providing 40 to 50 dB of signal level control.

Figure 5:
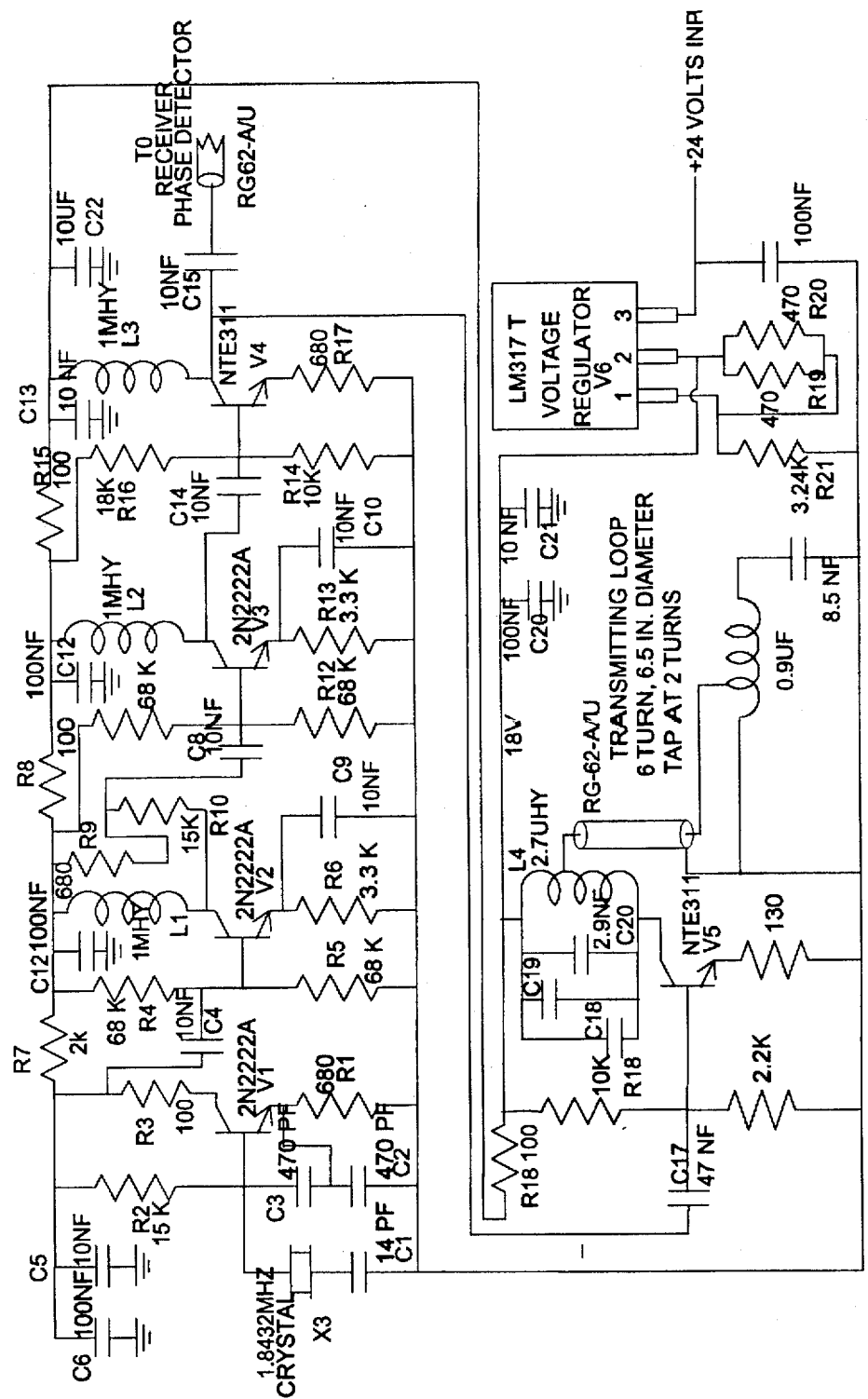
FIG. 5 is an electrical schematic diagram of a preferred embodiment of a non-radiative r.f. "transmitter" circuit to maintain an r.f. electromagnetic field in a "transmitter" loop, or coil, in and for the preferred embodiment of a vehicle in-lane detection and/or control system in accordance with the present invention.
Figure 6:
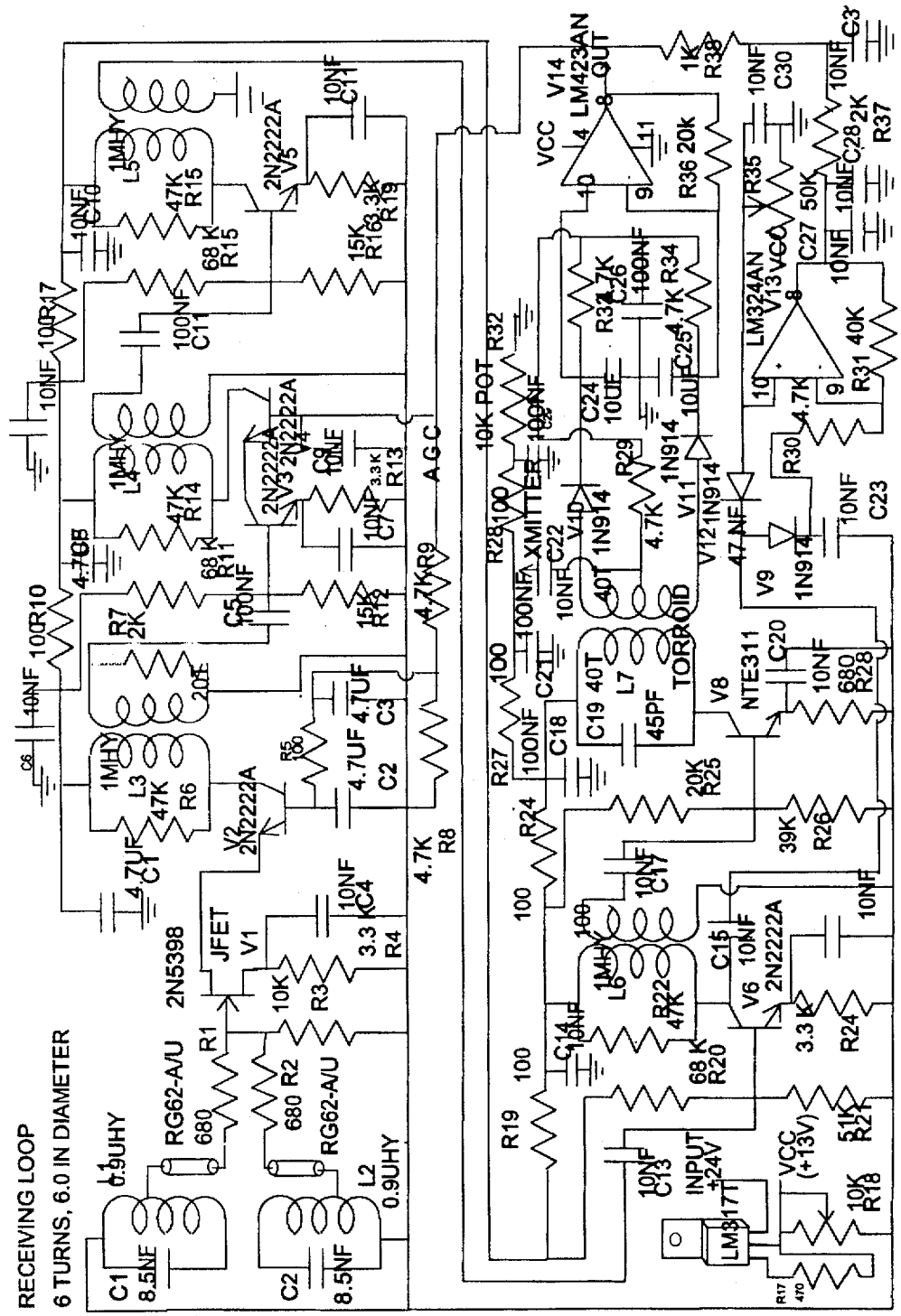
FIG. 6 is an electrical schematic diagram of a preferred embodiment of a non-radiative r.f. "receiver" for detecting an electromagnetic field induced in a "receiver" loop, or coil, in and for the preferred embodiment of a vehicle in-lane detection and/or control system in accordance with the present invention.
Figure 7:
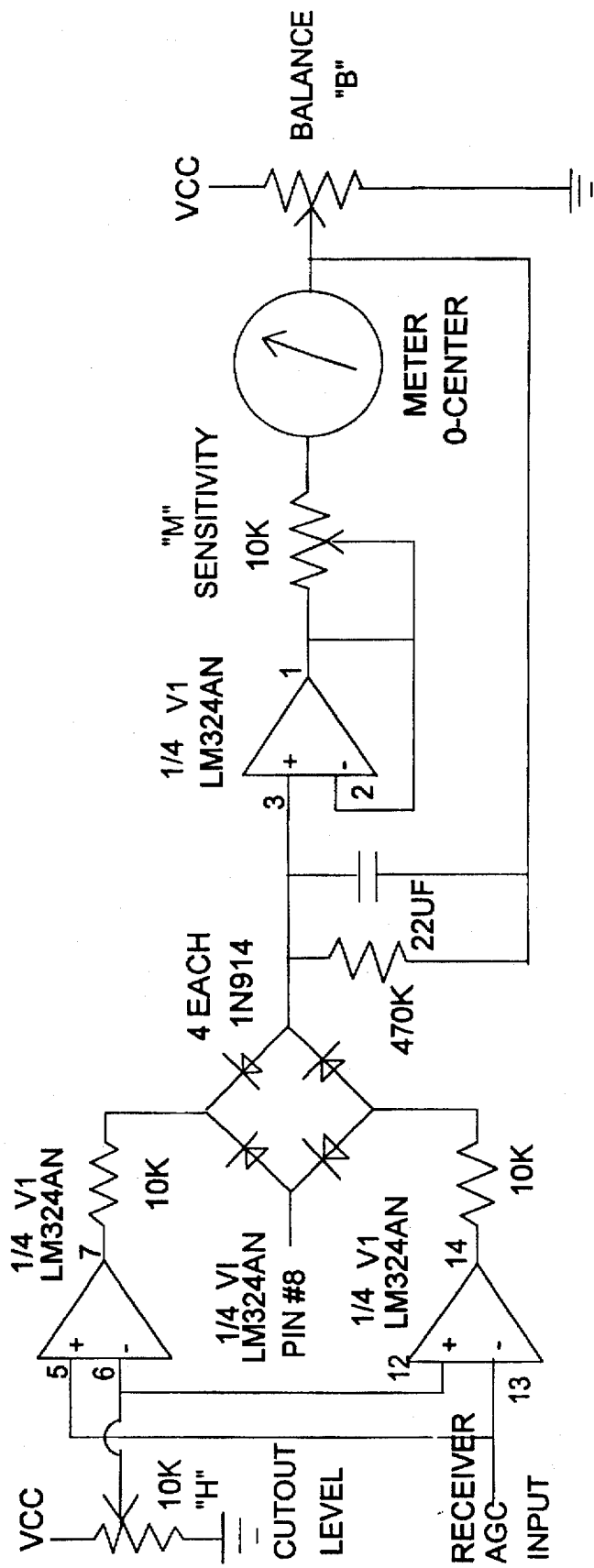
FIG. 7 is an electrical schematic diagram of a preferred embodiment of the output stage, driven from the r.f. "receiver", in and for the preferred embodiment of a vehicle in-lane detection and/or control system in accordance with the present invention.

An electrical schematic diagram of a preferred embodiment of a r.f. transmitter in and for the preferred embodiment of a vehicle in-lane detection and/or control system is shown in FIG. 5. Similarly, an electrical schematic diagram of a preferred embodiment of a r.f. receiver in and for the preferred embodiment of a vehicle in-lane detection and/or control system is shown in FIG. 6. Finally, an electrical schematic diagram of a preferred embodiment of the output stage, which is driven from the r.f. receiver, in and for the preferred embodiment of a vehicle in-lane detection and/or control system is shown in FIG. 7.

5. System Test

With the redesign to 1.8432 MHz complete, the components were assembled and system testing resumed. The primary objectives were to optimize the size of the coils in conjunction with the range measurement requirements. To this end a series of one way range measurements were made with various size coils. A summary of the results of these tests is contained within the following table of coil comparisons (for use as preferred coils in and for the preferred embodiment of a vehicle in-lane detection and/or control system in accordance with the present invention):

| Transmit Coil | Receive Coil | Two Foot Range Sensitivity |
| --- | --- | --- |
| 3.5" diameter, 2 turn | 3.5" diameter, 10 turn | −40 dB |
| 3.5" diameter, 2 turn | 18" diameter, 1 turn | −37 dB |
| 3.5" diameter, 2 turn | 3.5" diameter, 2 turn | −54 dB |
| 18" diameter, 1 turn | 18" diameter, 1 turn | −19 dB |
| 18" diameter, 1 turn | 3.5" diameter, 10 turn | −23 dB |
| 18" diameter, 1 turn | 6.2" diameter, 6 turn | −10 dB |

At first the 3.5" diameter 10 turn coil or the 6.2 inch diameter coil appeared attractive for the road coil because of the nominal dispersion loss. Upon further analysis it was found that the return link from the road to the vehicle would not be satisfactory. This can be appreciated by referring to the transfer characteristic equation of a double tuned circuit as follows:

$$\frac{E_2}{E_1} = \frac{-M}{C_2(R_1 R_2 + \omega^2 M^2)}$$

where $E_2$ and $E_1$ are the secondary and primary voltages, M is the mutual coupling, $R_1$ and $R_2$ are the primary and secondary impedance at resonance, $\omega$ is the frequency of rotation and $C_2$ is the secondary capacitance. See K. R. Sturley, *Radio Receiver Design*, 2nd Edition, p.163, John Wiley & Sons Inc., 1953.

This equation shows that the secondary voltage can be increased by decreasing the secondary capacitance. This advantage is lost in the return link because of the reduced inductive coupling of the smaller coil without the compensation of a smaller capacitance in the secondary. The previous table lists results where a small coil is used to transmit a signal to a second coil. The resulting loss is substantially higher for the small primary coil regardless of the size of the secondary coil.

Based on the test data and taking into consideration the need for an economical installation, the preferred coils for the system were selected as follows:

| Coil | Turns | Diameter |
| --- | --- | --- |
| Vehicle Transmit | 6 | 6 in. |
| Vehicle Receive | 6 | 6 in. |
| Road | 1 | 11.5 in. |

All of the coils were constructed using No. 12 copper wire with an appropriate capacitor, nominally a chip capacitor of 10 nanofarads capacitance, to achieve resonance at 1.8432 MHz.

Range measurements were made using these coils in a typical vehicle installation. The transmit and receive coils were arranged to be cross polarized with the transmit coil vertical and the receive coil horizontal as was previously shown in FIGS. 2 and 3. The side by side arrangement was selected for convenience in adjusting for isolation between the transmit and receive coils. This arrangement also allowed for a radiation shield to be placed between the two coils to increase the isolation. Since the shield was found not to be necessary, the concentric mounting appear to be most appropriate for future installations. The advantage is that it only requires half the space for the vehicle's coils.

Although the detector output can be used for automatic steering of the vehicle, in a rudimentary and exemplary use of the system and method of the present invention a meter added to the system provides the driver with steering information. The meter indication both permits and requires the driver to keep the vehicle centered. Initially the meter indications appeared to be very confusing because of noise. When a signal was present the meter was well-behaved. However, whenever no signal was present the meter indication was completely random. It was appreciated that a road coil return would not always be present. The system inherently nulls out the signal return when the road coil is centered with respect to the vehicle module.

In order to avoid any problems with meter indications, as well as any possible constraints in the road coil spacing, a sample and hold circuit was added to the receiver, as is visible in FIG. 7. This additional circuit permits the receiver to obtain a sample when a signal is present, and to then hold this sample signal until another sample becomes available. The preferred circuit uses the AGC (automatic gain control) voltage in the receiver to gate the direction signal to the meter whenever the receiver input exceeds a designated level. A dramatic improvement in the meter response was observed with the implementation of this circuit. The meter indication remained at center scale until an error signal was detected. If a left or right signal was detected the meter held the meter indication until the next input sample was detected.

With the sample and hold circuit functioning it was possible to efficiently diagram the azimuth range between the road coil and the vehicle. In determining how the operational range varied with azimuth angle around the vehicle coils a "foot print" diagram was found to be the most graphic and understandable. The foot print data was obtained by moving a road coil around on the road surface under the vehicle and establishing the profile where the received signal (AGC voltage) was constant. A typical footprint diagram is shown in FIG. 8.

The minor unbalance shown in the footprint diagram was found to be leakage from the transmitter directly to the receiver. Both the transmitter to transmitter coil, and the receiver to the receiver's coaxial cable were approximately 3 feet long. This provided a small but perceptible leakage path around the coil which produced the unbalanced signal on one side. Production configurations of the circuit eliminate this unbalance by shortening the cable runs and by using solid jacket coaxial cables instead of braided shield cables.

Figure 8:
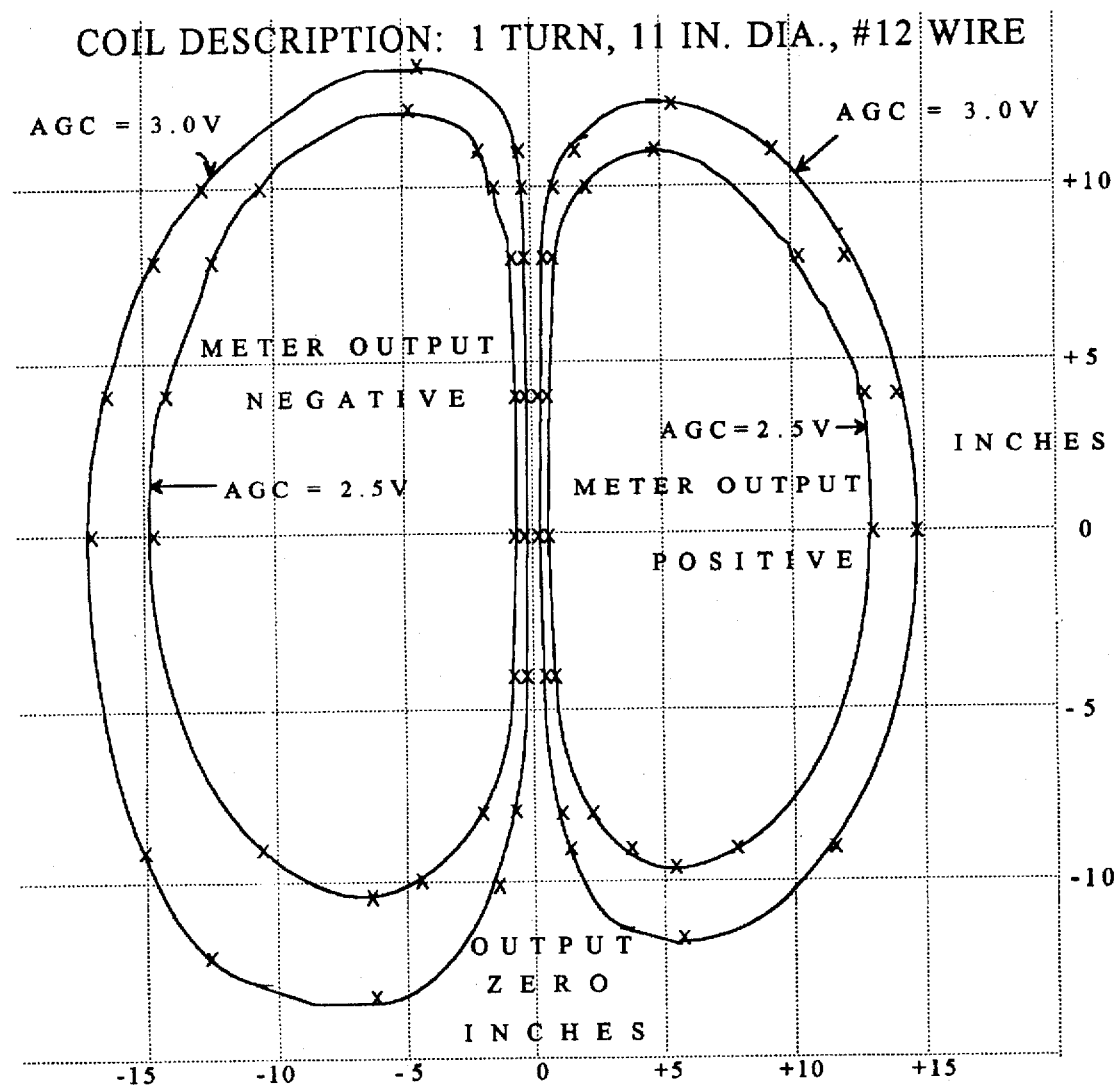
FIG. 8 is a footprint diagram, being a graph of contours where the received signal, or AGC voltage, remains constant as the azimuth angle between the road coil and the vehicle is varied (by moving a road coil around on the road surface under the vehicle and establishing the profile) in the preferred embodiment of a vehicle in-lane detection and/or control system in accordance with the present invention.
Figure 9:
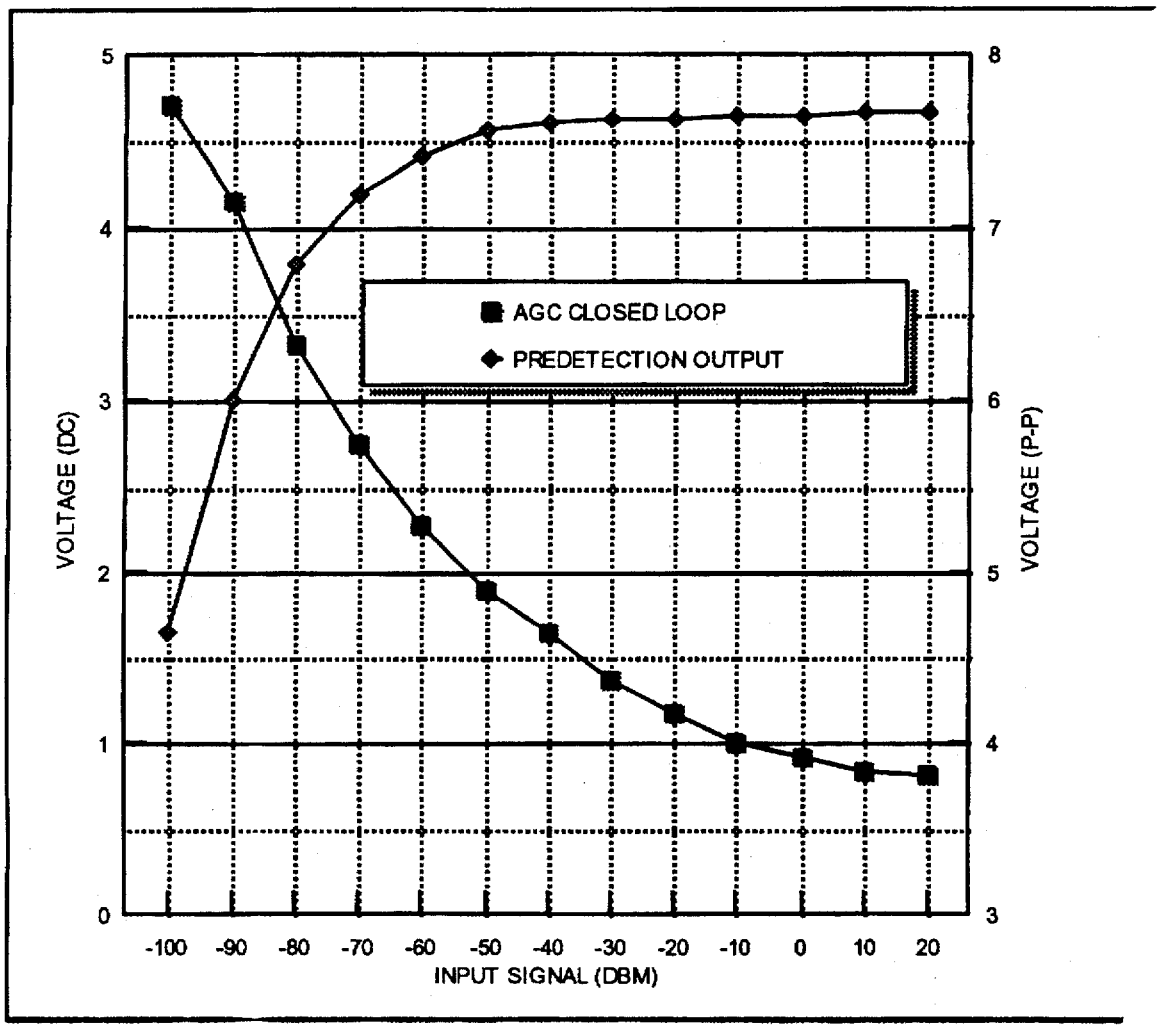
FIG. 9 is a graph of receiver sensitivity in the preferred embodiment of a vehicle in-lane detection and/or control system in accordance with the present invention.
Figure 10:
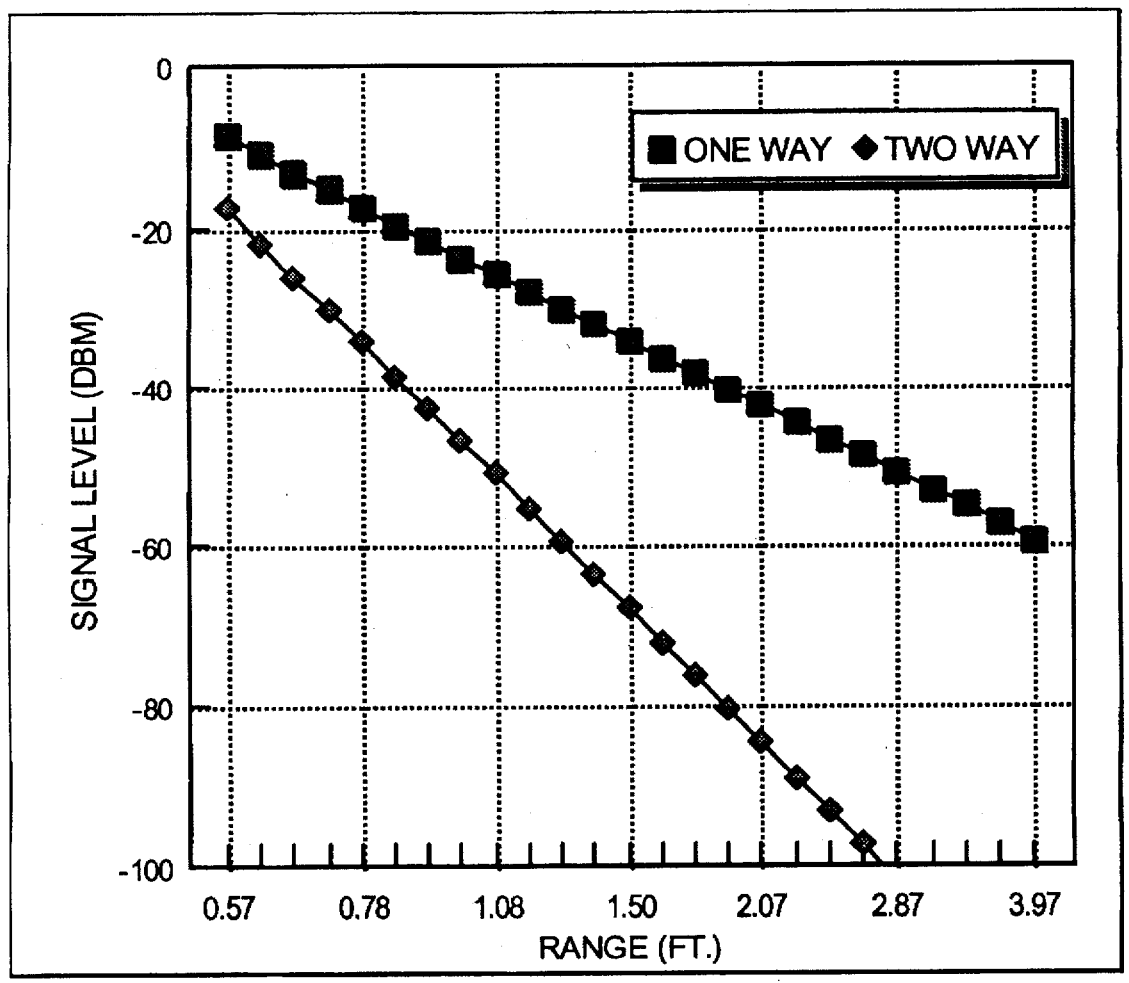
FIG. 10 is a graph of range sensitivity in the preferred embodiment of a vehicle in-lane detection and/or control system in accordance with the present invention.

A representative range measurement taken from FIG. 8 can be used to project range based on changes in the receiver sensitivity. The receiver AGC voltage provides a calibration on the received signal level into the receiver. This relationship is reflected in the receiver sensitivity curve shown in FIG. 9. This curve shows the receive signal level is −68 dBM at an AGC voltage of 2.5 volts, providing a reference point on the two way sensitivity verses range curve shown in FIG. 10.

The slope of the two-way ranging curve is 36 dB per octave while the slope of the one ranging curve is 18 dB per octave which represents the dispersion loss operating in the static near field. With the road coils, vehicle coils, transmitted power and receiver sensitivity presently used, the range is shown to be limited to something less than 2.87 feet.

5. Tests of the Resonant Loop In-Lane Detection System

Later, actual, road tests under these operational constraints were conducted. The results of these tests established that the design as defined and taught within this specification provided, when implemented, acceptable performance.

Road tests were conducted in a parking area where a painted center line was visible with parking spaces marked on 13 foot centers. Road coils were placed on the center line at each parking space marker or 13 feet apart. Two rows of 25 coils were laid out with sufficient space between the two rows for a vehicle to conveniently make a U turn and proceed down the next row of coils.

As the test vehicle was driven up and down the rows of road coils two methods of recording the results were implemented. A strip chart recorder was used to record the direction error signal to the meter and a video camera was used to record a panoramic view from the back seat of the test vehicle. As the vehicle proceeded down a row of coils the video showed the positive and negative meter needle swings following and correlating with the vehicle position on the left or right side of the center line.

The strip chart recorder tape also shows the left or right error signal as the vehicle down a particular row of road coils. These tape recordings can be followed along with the video to see the corresponding deviations and the correlation that exists. A reconstructed copy of the data recorded by the strip cart recorder is shown in FIG. 11, consisting of FIGS. 11a and 11b. Two runs are reproduced. In each case the strip chart recorder speed of recording was constant so the horizontal transitions of the pen represent the 13 feet between the road coils. The vertical transitions of the pen represent the time the vehicle was passing over the road coils. In each case the vehicle is seen to accelerated from the beginning of the run to the end.

The charge and discharge time in the sample and hold circuit was an arbitrary selection. The discharge time constant was approximately 6 seconds and the charge time-constant was approximately 100 ms. Optimum values will await further testing. It is anticipated that the time constants will be dynamically scales and adjusted in proportion to vehicle speed.

The phase detector output in the vehicle is very sensitive and the null at the center with the sensitivity setting of the AGC cutout. The higher the sensitivity the narrower the null becomes. For the tests to date the center null was set to be approximately one-half inch wide. With in the one-half inch area the phase detector output is zero and as soon as the road coil goes outside the null area the phase detector output quickly goes to full output. The servo system should therefore make steering corrections based on a reasonable "g" load which the car and passengers can accommodate safely and comfortably. It is possible to use the receiver AGC to further define the vehicle position relative to the center line of the lane. A profile of the AGC voltage versus distance from the lane center is shown in FIG. 12.

Figure 12:
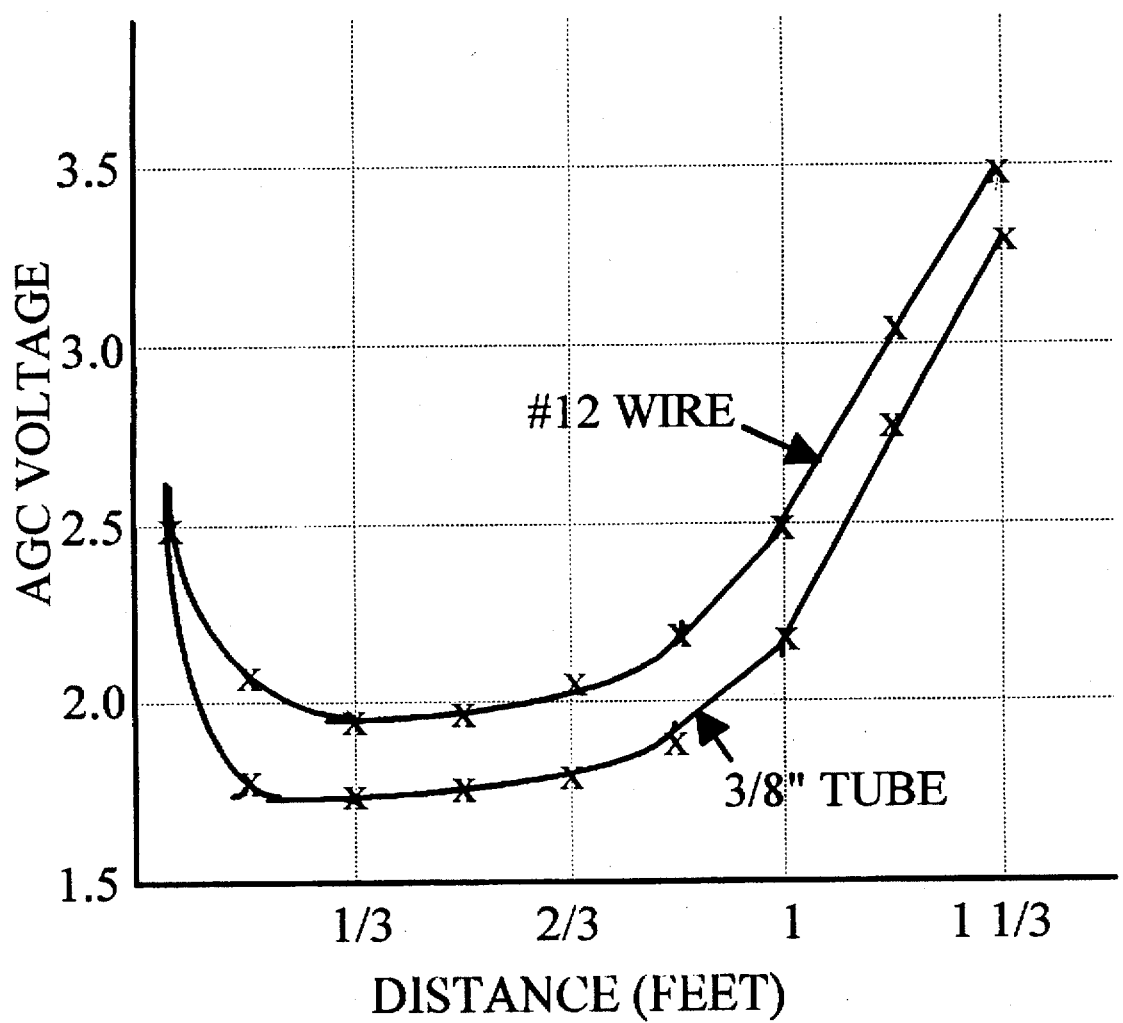
FIG. 12 is a graph of receiver Automatic Gain Control, or AGC, versus range in the preferred embodiment of a vehicle in-lane detection and/or control system in accordance with the present invention.

The AGC versus range data shown in FIG. 12 was taken at right angles to the lane center line with the range measured from the center of the vehicle transmit and receive coils.

The ultimate selection of a system for lane control will be based on achieving the desired functionality at the minimum cost. It is therefore necessary and essential to access the costs associated with the resonant loop system. A major element and possibly the dominant portion of the system cost is associated with the road way modification requirements.

Figure 13:
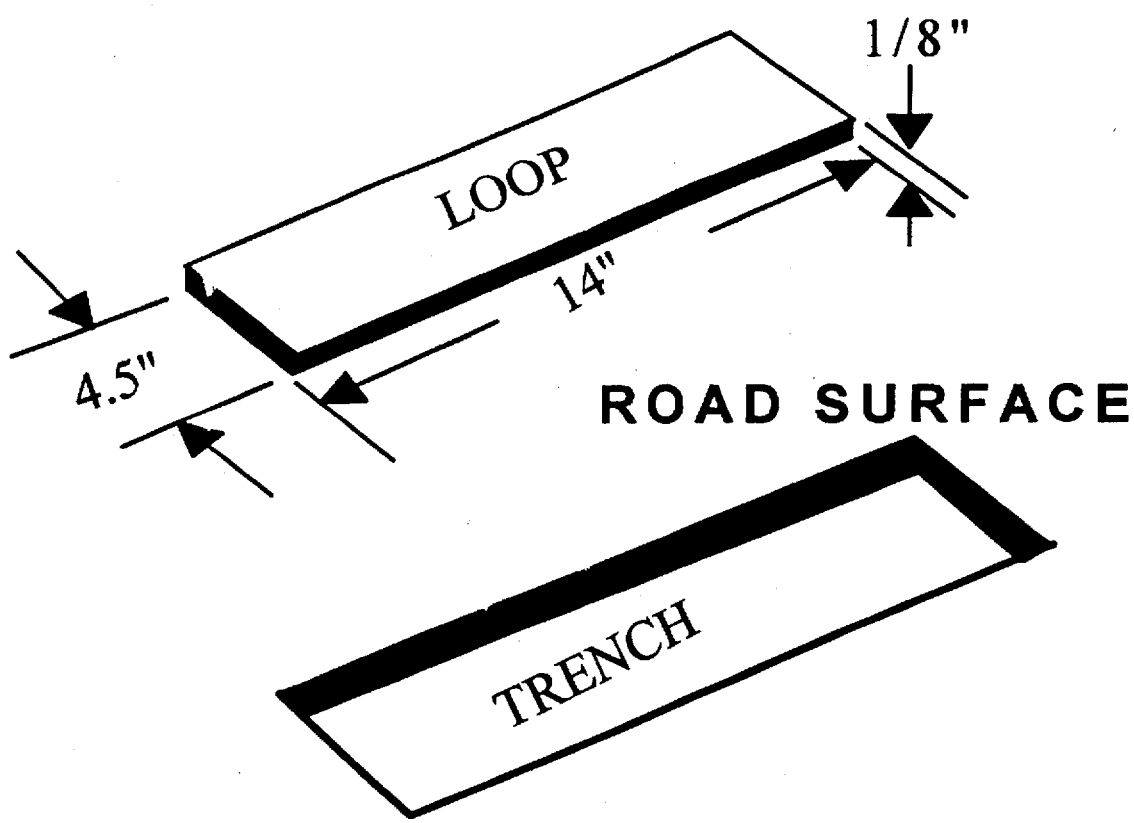
FIG. 13 is a diagrammatic representation of the installation of resonant loop coils in a road surface in the preferred embodiment of a vehicle in-lane detection and/or control system in accordance with the present invention.

The loops could be buried when the road is surfaced or installed by grinding a shallow trench in an existing road surface similar to the method presently used to install reflector markers. Loops would be produced that closely fits the trench as shown in FIG. 13.

This will facilitate a simple and relatively quick installation. The trench would be produced by a grinding process followed by the adhesion of the Loop assembly into the trench with a bituminous compound at 425° F. The bituminous compound cools quickly and the adhesion is firm in a few seconds. Cost estimates for the installation was found to vary to some degree depending on personal appraisals. Estimates were obtained in California from: CALTRANS, district 11 Office of Engineers; PEEL, a Pasadena Contractor; WORKS, a Palm Springs Contractor; and PACO, a San Diego Contractor.

The actual costs are only obtained by establishing a specification which defines the quantity, location, etc. and followed by a competitive procurement. Historical data furnished by CALTRANS show the average cost for reflector markers installed during 1994 was $9.33. This includes 16 separate contracts with quantities per contract varying from 5 markers to 8,520 markers. The procurements do not identify or separate the cost elements but estimates indicate that the grinding represents about 75% of the total cost or about $7.00.

Since the volume of the road material to be extracted for the road coil loops would be only 22% of the volume currently being extracted for the reflective markers, the grinding time would be reduced a commensurate percentage. The grinding costs are amplified by the safety aspects of a typical installation. Five vehicles are typically involved including two vehicles to identify the lanes with the reflector markers, a crash cushion "attenuator" truck, a monitoring pickup truck and the actual installation vehicle. With the labor and equipment required during the grinding and installation process, any savings in time translates into significant cost savings. Taking into consideration the reduction in the grinding time but adding time for the adhesion process estimates were found to vary from $4.00 to $5.00 for the installation.

The cost for the road coil assembly is estimated to be comparable to the reflective markers. Both reflective markers and the loops would be molded assemblies. A cost tradeoff would consist of the elimination of the glass reflector and the addition of the electrical components required for the resonant circuit. These electrical components consist of a #12 wire 30 inches long and a capacitor. The present lane reflector markers sell for less than $2.00 in large quantities.

Combining the installation with the loop assembly cost the overall cost appears to be $6.00 to $7.00 per loop providing the number of loops installed is 15,000 or greater. These figures can only be considered rough estimates which must be validated by an actual procurement.

Costs for the resonant loop system vehicle module are principally made up of the coil assembly and the electronic circuits. In both cases the existing breadboard provides very little beyond a functionality basis for a future production unit.

The existing coil assembly was constructed with the transmit coil and the receive coil separated. Now that the isolation has been relaxed with the addition of the "sample and hold" circuit a concentric coil assembly would be possible and more economical. Tooling fixtures will be necessary to insure the required orientation tolerance. Once the fixtures and processes are designed the coil assembly would be comparable to a transformer with a six turn primary and a six turn secondary winding. Certainly the cost would be in the less that $10.00 range.

Costs for the receiver and transmitter electronics will depend on the availability and/or development of LSI (large scale integration) circuits. Comparable circuits in the VHF (very high frequency) range are currently available for less than $5.00 each.

6. Fully Automated In-Lane Control

Nationwide U.S. implementation of a resonant loop lane control (as opposed to a detection) system presents a major long term national investment. The magnitude of the investment can be appreciated by considering that all the major highways and all the vehicles using these highways would be directly involved. Obviously the implementation decision as well as the implementation task must be approached with caution. A prudent and conservative approach to implementation would be a phased approach starting with a limited installation.

An immediate control system implementation task will be to verify the applicability of the resonant loop technology to automatic vehicle guidance and control function. This is best accomplished under well defined and controlled conditions. A well instrumented vehicle and test track will be used in this regard.

A second control system implementation stage will include the environmental testing of the vehicle and reference road coil modules. Tests would include temperature, vibration, shock, acceleration, salt air corrosion, salt water corrosion and life. Life tests would include the determination of mean time before failure (MTBF) and mean time to repair (MTTR). Since these tests are time consuming and reasonably expensive it would be advisable to consider a constrained operational test to be run concurrent with the environmental tests.

Throughout northern regions of the U.S. there are locations where snowplows repeatedly clear roads with boundaries difficult to identify after a light snow fall. These locations often use tall reflector poles for boundary markers with the visibility compromised by inclement weather. A limited installation of the resonant loop equipment both in the snowplows and in the road would provide an excellent and practical application. A need would be satisfied and the installation would provide an invaluable "beta" test site for system evaluation.

Full scale implementation of the automated vehicle in-lane control (as opposed to detection) system may be divided into three stages. Each of the three stages represents a milestone that can be used to access progress and compliance to national goals. These three stages are as follows:

(1) System configuration optimization
(2) Equipment preparation and vehicle integration
(3) Road test and results evaluation.

6.1 In-Lane Control System Configuration Optimization

An optimum configuration for an in-lane control system can most economically be established with a simulation analysis. Fortunately the existing PATH system and analysis is easily adaptable for evaluation and optimization of the resonant loop controlled vehicle system. See Huie Peng and Masauyoshi Tomizuka, "Lateral Control of Front-Wheel-Steering Rubber-Tire Vehicles", PATH Report UCB-ITS-PRR-90-5, July 1990, pp. 30, 37. The modeling accomplished and documented by PATH can accommodate the resonant coil system of the present invention with only minor revisions. Utilizing this comprehensive analysis facilitates an efficient modeling effort to establish a optimum configuration for the resonant loop sensor. Private communications of the inventor with PATH engineering manager, Dr. Hanshue Tan, have verified that the PATH analysis is directly applicable, and the support and recommendations of Mr. Tan have been appreciated.

A preliminary discussion with Dr. Hanshue Tan established that the simplified vehicle model represented by the vehicle schematic diagram of FIG. 14 would be applicable for the resonant loop evaluation. The block diagram developed by PATH for the permanent magnet sensor is shown in FIG. 15. The only major alteration is the replacement of the magnetic sensor by the resonant loop sensor.

Figure 14:
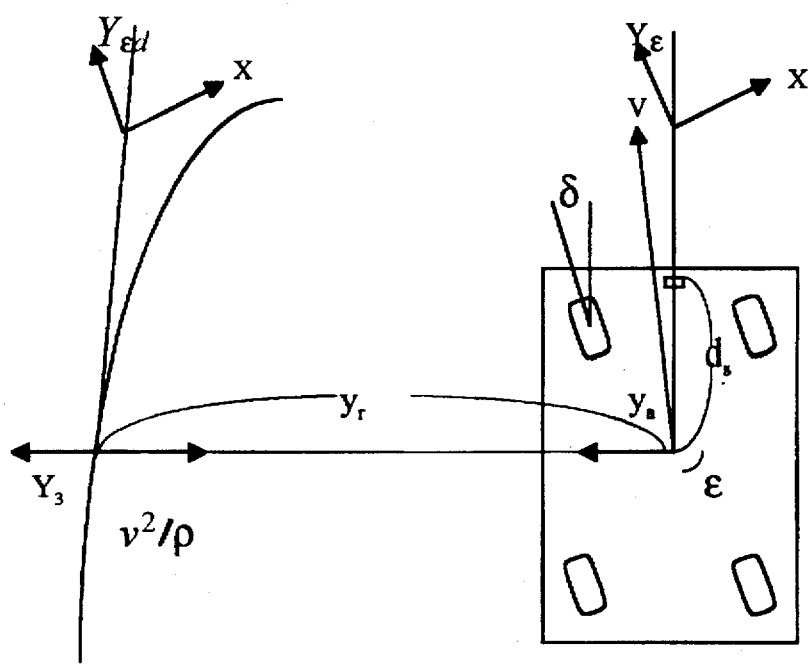
FIG. 14 is a vehicle schematic diagram showing a simplified model usable in the evaluation of the resonant loop detection of the present invention as part of a vehicle in-lane control system.
Figure 15:
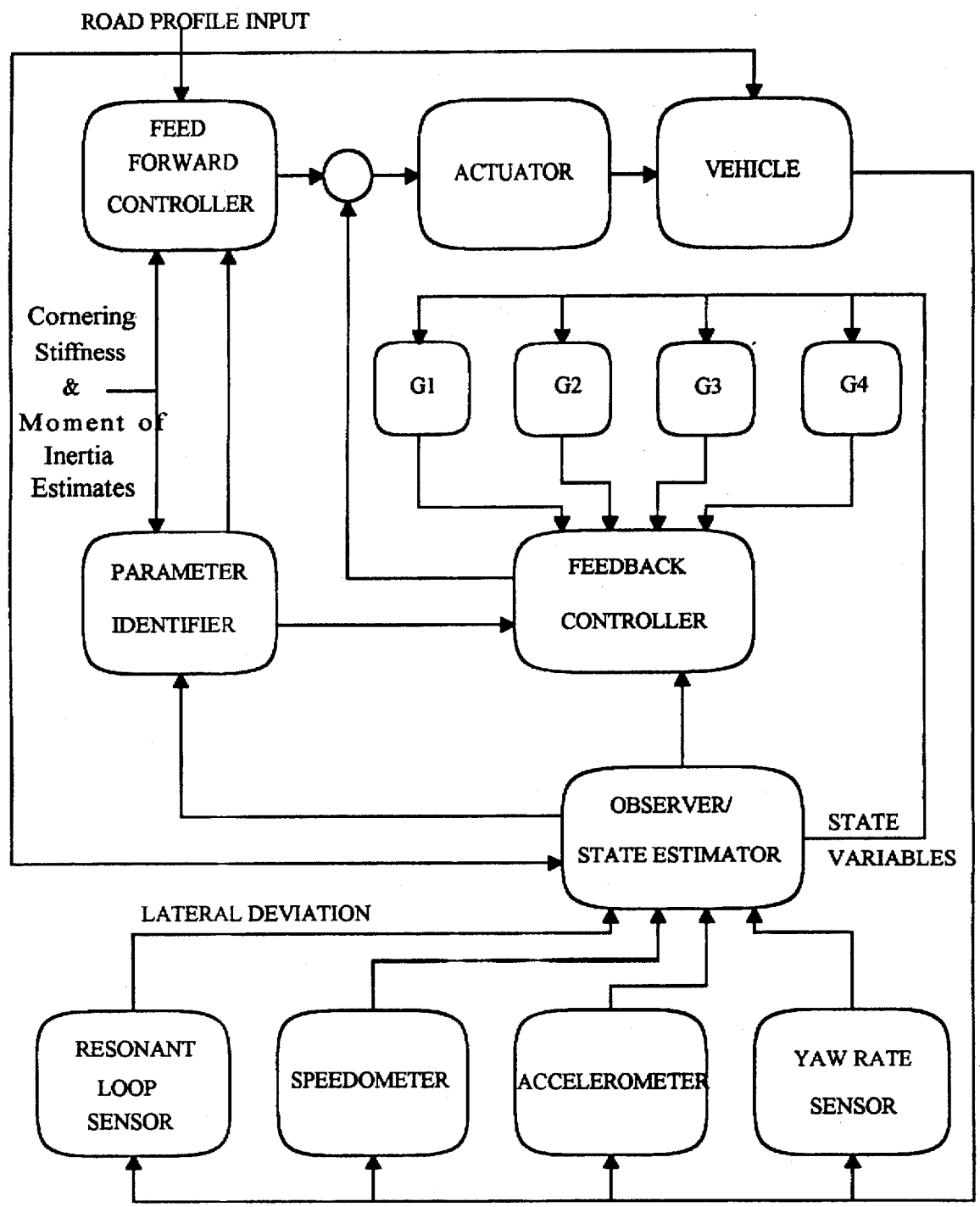
FIG. 15 is a schematic block diagram of a vehicle in-lane control system in accordance with the present invention wherein the only major change from an existing system of the PATH program of the U.S. DOT is the replacement of magnetic sensors, and detection, by the resonant loops, and by the r.f. resonant loop detection, of the present invention.

The simplified model of FIGS. 14 and 15 as represented in space state form by the PATH Equation 1, appearing in the Peng and Tomizuka reference previously cited, is reproduced and inserted in FIG. 17 for reference. The resonant loop output may or may not be identical to the magnetometer output of equation 2, shown in FIG. 18.

There are two candidate resonant loop receiver configurations available. The previously tested configuration that provides a fixed value lateral displacement error output and a new configuration that provides an error output proportional to the offset. The new configuration is represented by equation (2) (shown in FIG. 18) and therefore completely compatible with the PATH simulation.

Figure 16:
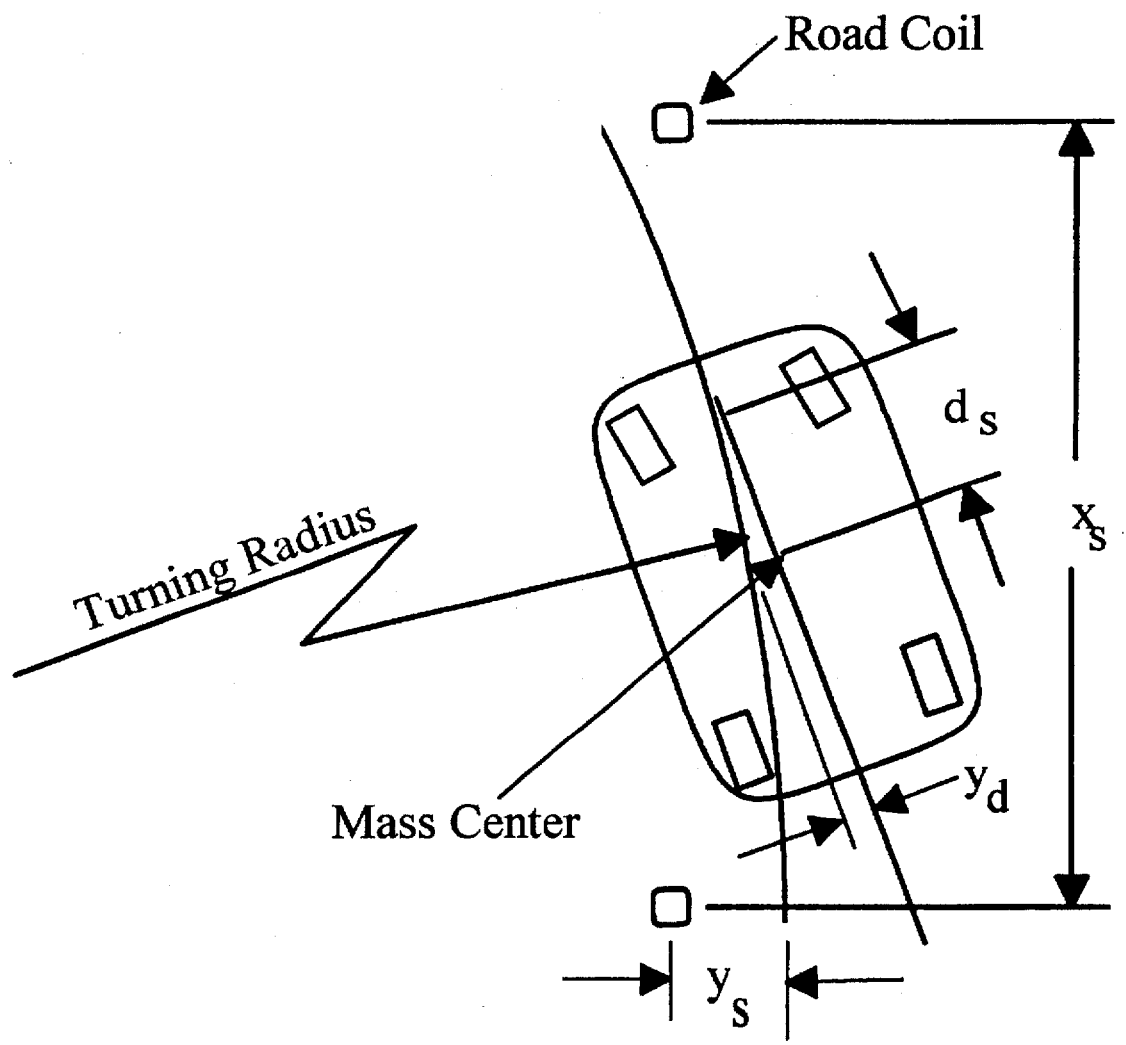
FIG. 16 is an exaggerated schematic diagram of the offset experienced by the vehicle in-lane control system in accordance with the present invention when it passes by resonant loop sensors in the road.

The original receiver configuration would always result in a steer left or steer right signal when a road coil is passed. FIG. 16 shows an exaggerated diagram used to clarify the resulting offset error equation. In concert with the diagram, the steering correction is established by limiting the lateral acceleration to a value compatible with passenger comfort. This geometry was utilized to arrive at the lateral offset for a vehicle following straight line course. The referenced offsets are shown in Equation 3 and Equation 4 respectively contained in FIGS. 19 and 20, where "a" is the acceptable lateral acceleration and "v" is the vehicle velocity.

The deviation of the vehicle mass center to the center line $y_c$ is shown by Equation (5) contained in FIG. 21.

Substituting 0.2 g for an acceptable lateral acceleration and 60 mph for vehicle velocity the lateral error $v_c$ is 0.37 inches. Which of the two candidate resonant loop detectors to be implemented will be determined during the system optimization stage. Compatibility and accuracy appear to favor the linear detection process.

The constants used in Equation 1 are further identified by Equations 7 through 14 respectively contained in FIGS. 23 through 30. The nomenclature for the model is described as follows:

Term $y_r$ is the lateral distance between the mass center and the center line of the road.

Term $\epsilon$ is the yaw angle of vehicle body.

Term $\epsilon_d$ is the desired yaw angle set by the road.

Term $d_s$ is the distance from vehicle mass center to the resonant loop sensor.

Term V is the longitudinal velocity of vehicle.

Term $\rho$ is the radius of curvature of the road.

Term $\delta$ is the front wheel steering angle.

Term $C_{Si}$ is the cornering stiffness of i'th tire.

Term $F_{xi}$ is the side force on i'th tire.

Term $I_Z$ is the moment of inertia in (Z) direction.

Terms $I_1$ and $I_2$ are the distances from the center of gravity to, respectively, the front and the rear axle.

Two areas of particular interest with respect to the resonant loop approach of the present invention are the coil spacing and lateral error output. These two system design parameters are significant cost drivers and are also interrelated. The interrelationship primarily exists because both parameters have an affect on the steering accuracy. Other factors that also impact the steering accuracy are the vehicle velocity and the road curvature, passenger comfort and servo stability. How these factors interrelate and how the system design can be modified to obtain optimum performance commensurate with cost may readily be examined by a practitioner of the electronic systems integration arts in a first stage of full scale development.

Currently the resonant coil system output is extremely sensitive to lateral position in the vicinity of the center line. The output polarity reverses as the vehicle traverses the center line and full output amplitude is provided typically in less than one inch. How this can best be utilized by the vehicle steering servo will be explored in an optimization process. As a possible alternative a system configuration variation has been investigated which provides a linear transition as the center line is traversed.

Figure 31:
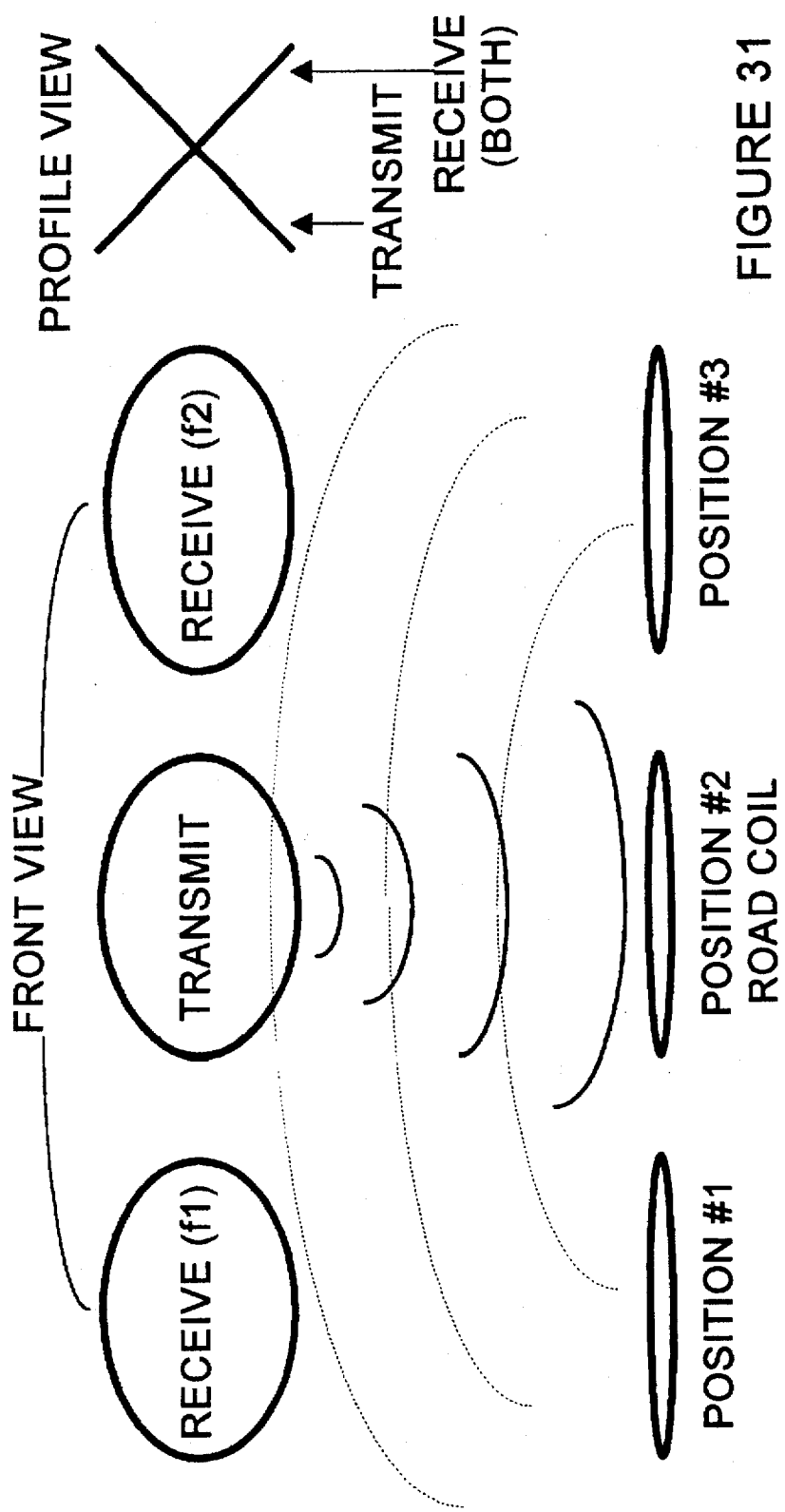
FIG. 31 is a diagrammatic representation as to how a two-coil, as opposed to a one-coil, "receiver" can be used to provide a linear phase output in the vicinity of the center-line crossover.
Figure 32:
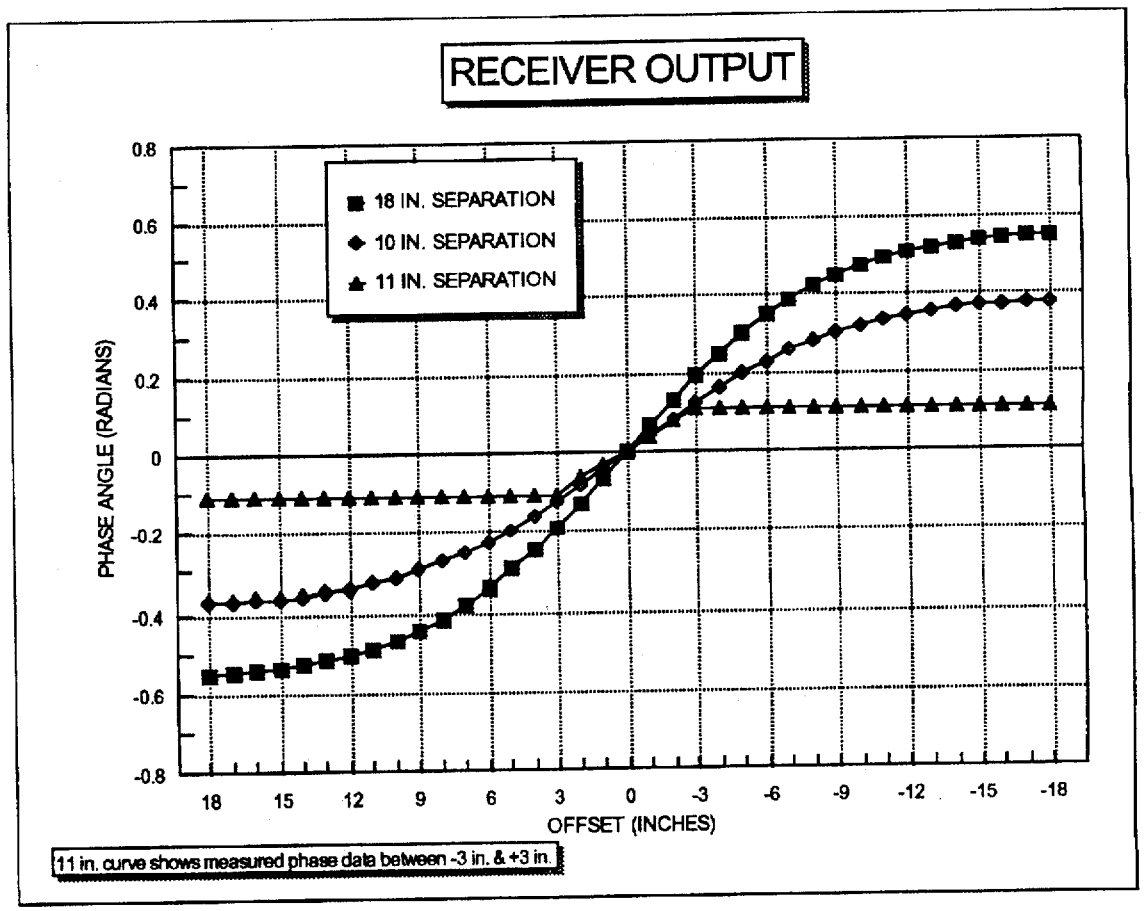
FIG. 32 is a graph showing a test of the two-coil, as opposed to a one-coil, "receiver" having a linear phase output in the vicinity of the road center-line crossover.

Realizing that the permanent magnet sensor provides an output proportional to lateral displacement, an effort was made to duplicate that performance characteristic. It was ultimately found that a two coil receiver can be utilized to provide a linear phase output in the vicinity of the center line crossover. How this is accomplished is shown in FIG. 31. The two receiver coils are tuned to two different resonant frequencies; one below the operational frequency and the second above the operational frequency. By selecting the frequencies and the bandwidth of the two coils, one provides a 45° phase lead at the operational frequency and the second provides a 45° phase lag at the operational frequency. The vector sum of the two coils is amplified in the receiver. When the two coil output vectors are the same, then the amplitude then the resulting vector is shown as $\theta_0$. If the receiver position is shifted then the amplitude of one coil vector increases while the amplitude of the other coil vector decreases, providing the resulting vectors with output phase angles of $\theta_1$ or $\theta_2$ as shown in FIG. 32. The resulting output vector amplitude remains the same for all cases because of the receiver AGC (automatic gain control).

Since the resonant loop system utilizes the static field, the amplitude is very sensitive to range variations. The one way received signal varies in proportion to the sixth power of range and the two way received signal varies in proportion to the twelfth power of range.

To verify the two coil receiver concept a one way test was conducted. A transmitter coil was placed 18 inches above two receiving coils spaced 11 inches apart. Then the transmitter coil was linearly displaced along the center line of the receiving coils. It was found that the receiver phase discriminator was linear over a range of six inches. The results of the test is shown in FIG. 6. Two additional curves are plotted showing calculated outputs for coil separation of ten inches and eighteen inches separation. The measured values tracked the calculated values over the linear FIG. 6 range of the existing receiver phase discriminator. More exacting tests may be accomplished after various redesigns of the receiver phase discriminator in order to extend the phase linearity.

The new detection process not only provides an output proportional to lateral deviation but also eliminates the signal cancellation at the center lane crossover point. These two advantages make the new detection process very attractive for the final version of the resonant loop vehicle steering system.

6.2 Equipment Preparation and Vehicle Integration

Early and expedient integration in an existing PATH test vehicle, or equivalent vehicle, is anticipated. Mounting locations for the transmitter and receiver coil assembly will be determined well in advance with a mockup utilized if the clearances become critical. Other requirements that will be considered include the following: (i) primary power, (ii) cable lengths, (iii) impedance, input and output, (iv) signal level flexibility, and, if an existing PATH vehicle is used in full scale development, (v) vehicle availability schedules.

Tests of the resonant loop system of the present invention already accomplished indicate that at least 50 road coils can be dispatched and retrieved in a less than one hour. Placement of the coils to a designated point with less than one-half inch error and staking the coils to avoid inadvertent movement will require additional effort and time. It must be emphasized however that the loss of a few coils would be anticipated and acceptable since the manufactured coil cost is less than ten cents.

The actual vehicle installation of the resonant loop hardware in the test vehicle should be completed within approximately two days. This is possible when the necessary preliminary work has been accomplished and if unanticipated problems are not significant. Field tests have a tendency to escalate but this particular test is an extrapolation of tests that have been in progress for a considerable period. It is also emphasized that the substitution of the resonant loop system for the permanent magnet system is a substitution that does not invalidate or alter the balance of the existing PATH vehicle hardware and software.

6.3 Road Test and Results Evaluation

With the simulation analysis having established a best case configuration and scenario, a road test will be conducted to verify the assumptions and results. The road test will be accomplished with the resonant loop system utilized to automatically steer a vehicle over a designated test track. It is anticipated that an iterative process will ensue to appropriately evaluate and fully explore the alternatives. Alternatives and variations that will require verifications and validations include the following: (i) servo stability, (ii) resonate loop output selection, (iii) road coil spacing, (iv) road coil misalignment, (v) missing road coils, (vi) lateral deviation errors, (vii) offset recovery time, (viii) road curvature, (ix) road coil spacing versus road curvature, (x) coil spacing to anticipate road curvature, and (xi) combinations of major factors affecting deviation accuracy.

After assembling all the data on the resonant loop system operation under the various combinations of factors described above a comparison with the permanent magnet system operation will be appropriate and necessary. Selecting a lane control system as a national standard will require exploring all the operational factors to insure the ultimate selection of the most robust system. Any and all performance advantages must be identified and balanced against the cost of providing the performance advantages. It is also possible that any given performance advantage that one system exhibits might be duplicated by the other system once it is identified and understood. Certainly a comprehensive analysis will thoroughly evaluate both systems with respect to the designated application.

6.4 Multi-Vehicle Use, Including in "Platooning"

A primary objective of the NAHSC (National Automated Highway System Consortium) is to increase throughput on existing highways with a concept referred to as "Platooning". The platoon consists of a number of vehicles automatically following each other in close proximity. Since it is clearly understood that safety must not be compromised, and preferably improved, the most "fool proof" method of accomplishing the close proximity platooning must be found. Currently a conflict appears to exist between: (1) permitting the vehicle to act as a free agent, (2) literally controlling the vehicle with a yet to be defined highway infrastructure or else (3) some combination of these two extremes. Seven very general system concepts are currently being considered with an objective to reduce the seven concepts to three by mid-1996. The following phase will be to reduce the three system concepts to a single system specification the following year.

A possible solution to this very perplexing and significant platoon problem has been identified utilizing a rather simple modification to the RLLCS (Resonant Loop Lane Control Sensor) of the present invention. This RLLCS modification would automatically synchronize the relative positions of all the vehicles in the same NAHSC lane and effectively establish a single infinitely long platoon. Egress, ingress and slot identification could also be accomplished.

Figure 33:
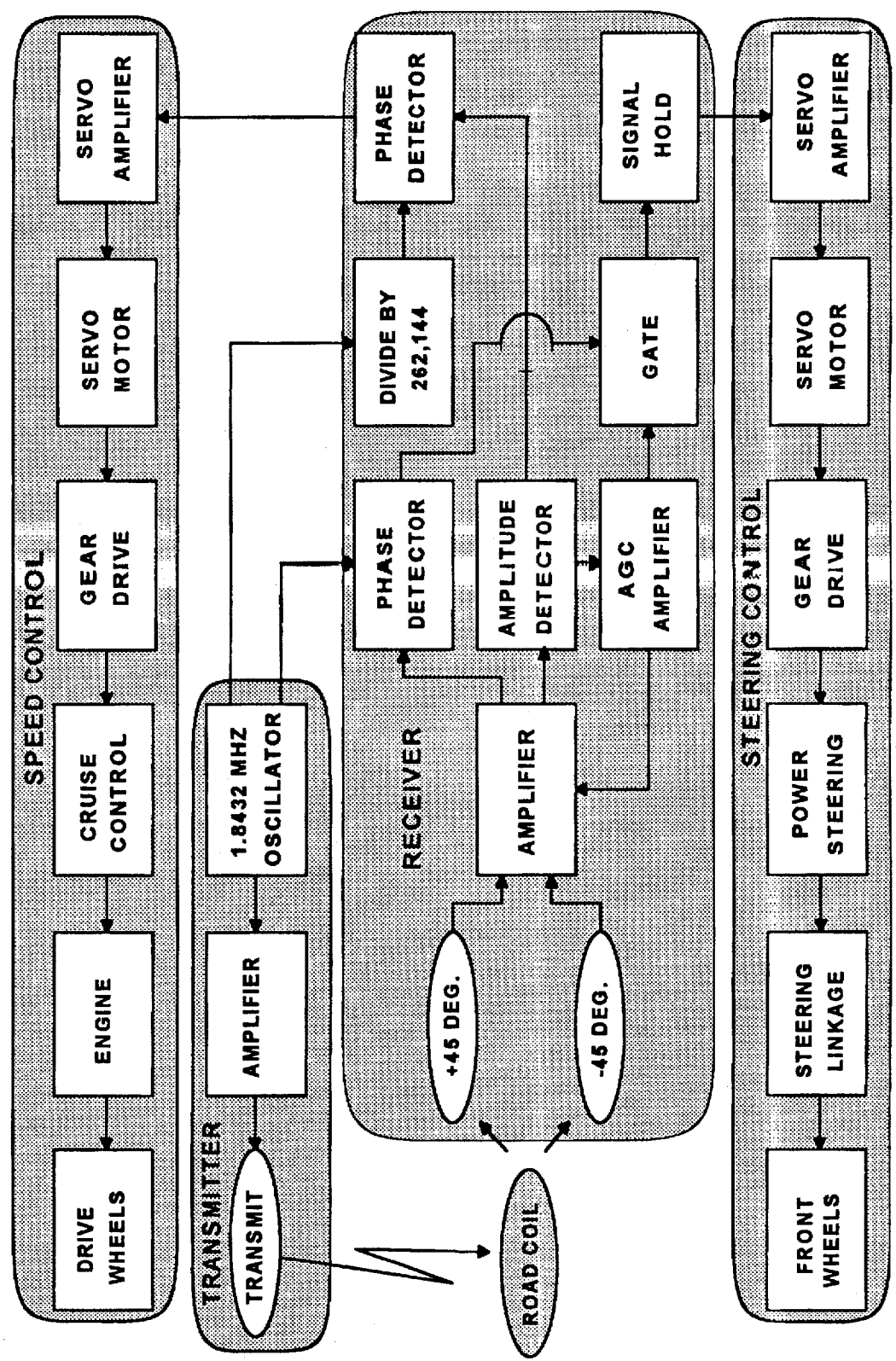
FIG. 33 is a schematic block diagram showing a system, using resonant loop detection in accordance with the present invention, for synchronizing the relative positions of vehicles in the same lane.

A block diagram of a system, using resonant loop detection in accordance with the present invention, for synchronizing the relative positions of vehicles in the same lane is shown in FIG. 33.

As an explanation of how the synchronization process could be accomplished consider the following:

Resonant loops are installed in the center of the NAHSC lane at equally spaced intervals (10 feet for example).

As any given vehicle traverses the road loops a recognizable signal is received by the vehicle RLLCS. The envelope of the received signal is phase compared to the phase of a sub-multiple of the existing RLLCS crystal oscillator, in a phase detector.

The phase detector output is an error signal that is used to servo control the vehicle speed. This results in the vehicle velocity being controlled to the stability of the crystal oscillator (assume 1 ppm). A vehicle traveling at 60 mph plus 1 ppm would close in on the next in line vehicle traveling at exactly 60 mph, about 3.8 inches per hour. As a further refinement all the individual vehicle oscillators could be phase locked to any common frequency standard which would eliminate any relative position creep.

Vehicle velocity could be modulated in different sections of the road simply by changing the loop spacing (e.g. increasing the coil spacing would automatically increase the vehicle speed proportionally).

The RLLCS to vehicle interface requires a modification to the RLLCS to achieve the velocity control consists of adding the circuitry to divide by 262,144 ($2^{18}$) and the phase detector. The gear drive, servo motor and servo amplifier components would be added to the vehicle in both the speed control and steering control to complete the installation.

There are many additional operational scenarios that could be accommodated once the velocity control has been established. The following are included as preliminary examples:

Vehicle position slots could be established by periodically installing additional loops halfway between the velocity controlling loops. The slot marking loop signals would only establish slot boundaries and would be time gated out of the velocity feedback control.

Egress could be accomplished by installing a second set of loops halfway between the lane velocity loops. An egress maneuver would be initiated by the driver manually entering a request for exit. The RLLCS having sensed the request would switch to the egress loop outputs when they next occur and automatically steer the vehicle out of the NAHSC lane and automatically reduce the vehicle velocity until a driver override occurs.

An overall adjustment in the velocity of a particular set of vehicles could be accomplished by commanding the designated vehicles to linearly switch to a lower sub-multiple of the oneboard crystal oscillator. An adjustment of this type could conceivably result from a lane blocking anomaly and would require additional infrastructure involvement.

The described velocity synchronization capability could be achieved with a modest increase in the RLLCS sensor circuitry and would preserve or increase the safety by locking the vehicles to a common velocity standard.

7. Standards

Full scale U.S. national implementation of a lane control system is going to require adopting a U.S. national and quite possibly an international standard. It is therefore possibly prudent and proper to only consider the next step in proving the viability and applicability of the resonant loop system with respect to this ultimate standard. A statement of work for immediate future development, implementation, validation and certification test would likely include the following: (i) design and fabrication of a consolidated concentric vehicle coil (ii) test of the revised coil assembly utilizing the existing breadboard electronics, (iii) preparation of an operational specification for a prototype resonant loop system, (iv) definition of the interface with existing vehicle automated steering control systems, (v) design and fabrication of prototype units, resulting in detailed manufacturing drawings for the prototype configuration, (vi) installation of the prototype system in a servo controlled vehicle, and (vii) road testing of the automatically-steered vehicle.

It is advanced that such a full scale test of the system of the present invention relative to the competing systems of the prior art discussed in section 2.3—Existing Vehicle Guidance Systems—of the BACKGROUND OF THE INVENTION section of this specification will indicate that (i) the discrete magnet sensing system, and (ii) the resonant loop sensing system of the present invention, presently provide the best fit of the overall ITS requirements. Further evidence of the compliance of the system of the present invention to the ITS operational requirements will be supplied by the automatic vehicle steering tests. The final tradeoff evaluation and selection of the most appropriate ITS system will depend on system cost and implementation expense.

In accordance with the preceding explanation, variations and adaptations of the vehicle in-lane positional indication/control system of the present invention where rf signals induced in completely-passive resonant-loop circuits buried along a road lane are phase detected will suggest themselves to a practitioner of the electronic systems design arts. For example, the forms, numbers, and/or relationship(s) of the loops, or coils, could be changed.

In accordance with these and other possible variations and adaptations of the present invention, the scope of the invention should be determined in accordance with the following claims, only, and not solely in accordance with that embodiment within which the invention has been taught.

What is claimed is:

1. A method of determining a vehicle's position on road lane comprising:

positioning a multiplicity of passive resonant circuits along a road lane;

inductively coupling a first electromagnetic field from a first loop means in the vehicle as the vehicle proceeds along the road lane so that electromagnetic energy is inductively coupled from this first loop means into one or more of the multiplicity of resonant circuits as are then proximate to the vehicle, causing these one or more resonant circuits to themselves produce another, second, electromagnetic field; and detecting, in another, second, loop means in the vehicle as the vehicle proceeds along the road lane, a phase and a polarity of the second electromagnetic field relative to a phase and a polarity of the first electromagnetic field as an indication of the vehicle's position upon the road land relative to those one or more of the multiplicity of resonant circuits into which energy was inductively coupled.

2. The method of determining a vehicle's position on road lane according to claim 1 wherein the positioning is of a multiplicity of passive resonant circuits each comprising a conductive loop, and a capacitor.

3. The method of determining a vehicle's position on road lane according to claim 2 wherein the positioning is of conductive loops oriented in substantially horizontal planes.

4. The method of determining a vehicle's position on road lane according to claim 1 wherein the positioning is of a multiplicity of passive resonant circuits along the approximate center of the road lane.

5. The method of determining a vehicle's position on road lane according to claim 1 wherein the inductively coupling is of a radio frequency electromagnetic field; and wherein the detecting is of a radio frequency electromagnetic field;

wherein nonetheless to the coupled and detected electromagnetic fields being of radio frequency, and thus susceptible of radiation, the coupling and the detecting are both inductive, and in a near field.

6. The method of determining a vehicle's position on road lane according to claim 5 wherein the inductively coupling and the detecting is of an electromagnetic field of radio frequency between 500 kHz and 5 MHz.

7. The method of determining a vehicle's position on road lane according to claim 5 wherein the inductively coupling of the radio frequency electromagnetic field is from a coil in the vehicle; and wherein the detecting of radio frequency electromagnetic field is in another, second, coil in the vehicle.

8. The method of determining a vehicle's position on road lane according to claim 7 wherein the inductively coupling of radio frequency electromagnetic field is from a first loop in the vehicle that is oriented substantially orthogonally to the second loop in the vehicle whereat transpires the detecting of radio frequency electromagnetic field.

9. The method of determining a vehicle's position on road lane according to claim 7 wherein the inductively coupling of radio frequency energy is from a first loop in the vehicle which loop is oriented in a substantially vertical plane; and wherein the detecting of radio frequency energy is in a second loop in the vehicle which loop is oriented in a substantially horizontal plane.

10. A system for determining a vehicle's position on a road lane comprising:

a multiplicity of passive resonant circuits positioned along a road lane;

electromagnetic field generating means in the vehicle for generating an electromagnetic field at the vehicle as the vehicle proceeds along the road lane so that energy of this electromagnetic field is inductively coupled into one or more of the multiplicity of resonant circuits as are then proximate to the vehicle;

detector means in the vehicle for detecting electromagnetic energy that is inductively coupled back from those one or more of the multiplicity of resonant circuits into which electromagnetic energy had first been coupled as the vehicle proceeds along the road lane; and phase-and-polarity means for comparing a phase and polarity of the generated electromagnetic field to a phase and polarity of the detected electromagnetic field to determine whether the detector means in the vehicle is to the left, or central, or to the right, of a then-proximate resonant circuit.

11. The system for determining a vehicle's position on a road lane according to claim 10 wherein at least one of the multiplicity of passive resonant circuits comprises:

a conductive loops; in electrical series with a capacitor.

12. The system for determining a vehicle's position on a road lane according to claim 11 wherein the multiplicity of conductive loops are oriented in substantially horizontal planes.

13. The system for determining a vehicle's position on a road lane according to claim 11 wherein the multiplicity of conductive loops are along the approximate center of the road lane.

14. The system for determining a vehicle's position on a road lane according to claim 11 wherein the electromagnetic field generating means is inductively coupling radio frequency energy; and wherein the detector means is detecting inductively-coupled radio frequency energy.

15. The system for determining a vehicle's position on a road lane according to claim 11 wherein the electromagnetic field generating means is inductively coupling, and the detector means is detecting, energy of a frequency between 500 kHz and 5 MHz.

16. The system for determining a vehicle's position on a road lane according to claim 10 wherein the electromagnetic field generating means comprises:

a first loop;

and wherein the detector means comprises:

a second loop.

17. The system for determining a vehicle's position on a road lane according to claim 16 wherein the first loop is oriented substantially orthogonally to the second loop.

18. The system for determining a vehicle's position on a road lane according to claim 17 wherein the first loop is oriented substantially in a vertical plane; and wherein the second loop is oriented substantially in a horizontal plane.

19. The system for determining a vehicle's position on a road lane according to claim 18 wherein the first loop comprises:

a coil;

and wherein the second loop comprises:

a coil.

20. A system for determining a vehicle's position on a road lane comprising:

a multiplicity of passive resonant circuits positioned along a road lane at least one of which includes a conductive loop, in electrical series with a capacitor;

an electromagnetic field generating means in the vehicle for generating an electromagnetic field at the vehicle as the vehicle proceeds along the road lane so the energy of the electromagnetic field is inductively coupled into one or more of the multiplicity of resonant circuits as are then proximate to the vehicle, the electromagnetic field generating means including a first loop;

a detector means in the vehicle for detecting electromagnetic energy that is inductively coupled back from those one or more of the multiplicity of resonant circuits into which electromagnetic energy had first been coupled as the vehicle proceeds along the road lane the detector means including two second loops (i) in the same plane, (ii) orthogonal relative to the first loop, and (iii) and at any arbitrary angle, other than 90°, relative to the conductive loop, and phase-and-polarity means for comparing the phase and polarity of the generated electromagnetic field to a phase and polarity of the detected electromagnetic field to determine whether the detector means in the vehicle is to the left, or central, or right of a then-proximate resonant circuit.

21. The system for determining a vehicle's position on a road lane according to claim 20 wherein the first loop is oriented substantially horizontally;

wherein each of the two second loops is (i) in the same plane, (ii) orthogonal relative to the first loop, and (iii) at any arbitrary angle, other than 90°, relative to the conductive loop.

22. The system for determining a vehicle's position on a road lane according to claim 10 wherein the phase-and-polarity means comprises:

an automatic gain control circuit.

23. The system for determining a vehicle's position on a road lane according to claim 10 wherein the phase-and-polarity means comprises:

a sample and hold circuit for momentarily holding sample determinations as to whether the detector means in the vehicle was to the left or to the right of a then proximate resonant circuit.

24. The system for determining a vehicle's position on a road lane according to claim 10 further comprising:

an indicator for displaying to a driver of the vehicle the successive determinations of the phase-and-polarity means as to whether the vehicle was to the left or to the right of a then proximate resonant circuit.

25. A relative-position detection system for a vehicle for determining the vehicle's left-right relative position:

a passive resonant circuit positioned as a reference;

an electromagnetic field generating means in the vehicle for generating an electromagnetic field at the vehicle, the energy of this electromagnetic field being inductively coupled in the near field into the passive resonant circuit;

a positionally-sensitive detector means in the vehicle for detecting an electromagnetic field that is inductively induced in the passive resonant circuit so as to produce a signal of a first polarity if the detector means is positionally to the left of the passive resonant circuit, and of an opposite, second, polarity if the detector means is positionally to the right of the passive resonant circuit.

26. A relative-position detection system for a vehicle for determining the vehicle's left-right relative position:

a passive resonant electrical circuit positioned as a reference;

an electromagnetic filed generating means in the vehicle for generating an electromagnetic field at the vehicle, the energy of this electromagnetic field being coupled in the near field into the resonant circuit;

a positionally-sensitive detector means in the vehicle for detecting an electromagnetic field that is inductively induced in the passive resonant circuit so as to produce a sisal of the first polarity if the detector means is positionally to the left of the passive resonant circuit, and of an opposite, second, polarity if the detector means is positionally to the right of the passive resonant circuit, the positionally-sensitive detector means including a loop in which a voltage is induced by the electromagnetic field that is itself inductively induced into the passive resonant circuit; and a phase-comparison means for comparing a phase of the generated electromagnetic field to a phase of the detected voltage to determine whether the detector means in the vehicle is positionally to the left, or to the right, of the passive resonant circuit.

* * * * *